US012799242B2

(12) United States Patent
Cen et al.

(10) Patent No.: US 12,799,242 B2
(45) Date of Patent: Nov. 17, 2026

(54) MAGNESIUM-BASED SOLID AND CATALYST COMPONENT HAVING MULTIMODAL PORE DISTRIBUTION, AND PREPARATION METHODS THEREFOR

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Wei Cen, Beijing (CN); Junling Zhou, Beijing (CN); Meiyan Fu, Beijing (CN); Lian Yan, Beijing (CN); Zhan Shi, Beijing (CN); Xiaofan Zhang, Beijing (CN); Xianzhi Xia, Beijing (CN); Zhengyang Guo, Beijing (CN); Jigui Zhang, Beijing (CN); Jie Lin, Beijing (CN); Lin Qi, Beijing (CN); Tianyi Zhang, Beijing (CN); Junhui Zhang, Beijing (CN); Hui Zhao, Beijing (CN); Yu Wang, Beijing (CN); Ying Wang, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 721 days.

(21) Appl. No.: 18/249,096

(22) PCT Filed: Oct. 15, 2021

(86) PCT No.: PCT/CN2021/124050
§ 371 (c)(1),
(2) Date: Apr. 14, 2023

(87) PCT Pub. No.: WO2022/078492
PCT Pub. Date: Apr. 21, 2022

(65) Prior Publication Data

US 2023/0391902 A1 Dec. 7, 2023

(30) Foreign Application Priority Data

Oct. 15, 2020 (CN) ......................... 202011104541.0
Oct. 15, 2020 (CN) ......................... 202011105648.7
Oct. 15, 2020 (CN) ......................... 202011105894.2

(51) Int. Cl.
*C08F 4/16* (2006.01)
*C08F 4/02* (2006.01)
*C08F 110/06* (2006.01)

(52) U.S. Cl.
CPC ............ *C08F 110/06* (2013.01); *C08F 4/022* (2013.01); *C08F 4/16* (2013.01)

(58) Field of Classification Search
CPC .................................. C08F 4/022; C08F 4/16
See application file for complete search history.

(56) References Cited

U.S. PATENT DOCUMENTS 5,231,066 A 7/1993 Rekers et al.
8,685,879 B2 4/2014 Spencer et al.
(Continued)

FOREIGN PATENT DOCUMENTS

CN 85100997 A 1/1987
CN 1175959 A 3/1998
(Continued)

OTHER PUBLICATIONS

Chumachenko, N. N. et al., "A study of the formation process of titanium-magnesium catalyst forpropylene polymerization", Applied Catalysis A: General, vol. 469, Jan. 17, 2014, pp. 512-516.
(Continued)

*Primary Examiner* — Catherine S Branch
(74) *Attorney, Agent, or Firm* — NKL Law; Allen Xue

(57) ABSTRACT

A magnesium-based solid, by means of determination based on a nitrogen adsorption method, has a multimodal pore distribution and a specific surface area of not less than 50 $m^2/g$, and the pore size distribution of the solid is in a range of 1 nm to 300 nm. There is at least one peak within a pore size range of less than 10 nm, and there is at least another peak within a pore size range of not less than 10 nm. A catalyst is formed using the solid catalyst component is used for propylene polymerization.

27 Claims, 4 Drawing Sheets

(56) References Cited

U.S. PATENT DOCUMENTS

| | | | |
|---|---|---|---|
| 2016/0009833 A1 | 1/2016 | Kaur et al. | |
| 2016/0251457 A1 | 9/2016 | Li et al. | |
| 2017/0044280 A1 | 2/2017 | Wang et al. | |
| 2019/0233569 A1 | 8/2019 | Umebayashi et al. | |

FOREIGN PATENT DOCUMENTS

| | | | |
|---|---|---|---|
| CN | 1250058 | A | 4/2000 |
| CN | 1097597 | C | 1/2003 |
| CN | 1442433 | A | 9/2003 |
| CN | 1478108 | A | 2/2004 |
| CN | 1508161 | A | 6/2004 |
| CN | 1684984 | A | 10/2005 |
| CN | 103626896 | A | 3/2014 |
| CN | 103772554 | A | 5/2014 |
| CN | 103772555 | A | 5/2014 |
| CN | 103788245 | A | 5/2014 |
| CN | 104231128 | A | 12/2014 |
| CN | 104558275 | A | 4/2015 |
| CN | 104650267 | A | 5/2015 |
| CN | 105175586 | A | 12/2015 |
| CN | 105330769 | A | 2/2016 |
| CN | 105440168 | A | 3/2016 |
| CN | 105482004 | A | 4/2016 |
| CN | 105622789 | A | 6/2016 |
| CN | 105622798 | A | 6/2016 |
| CN | 105622810 | A | 6/2016 |
| CN | 106467581 | A | 3/2017 |
| CN | 103619475 | B | 8/2017 |
| CN | 107207657 | A | 9/2017 |
| CN | 107629153 | A | 1/2018 |
| CN | 108341900 | A | 7/2018 |
| CN | 108623720 | A | 10/2018 |
| CN | 109819654 | A | 5/2019 |
| CN | 111072810 | A | 4/2020 |
| EP | 2671892 | A1 | 12/2013 |
| IN | 102952209 | A | 3/2013 |
| JP | 2010229347 | A | 10/2010 |
| RU | 2144041 | C1 | 1/2000 |
| RU | 2674440 | C1 | 12/2018 |
| WO | 2015177732 | A1 | 11/2015 |
| WO | 2016197014 | A1 | 12/2016 |
| WO | 2018066535 | A1 | 4/2018 |

OTHER PUBLICATIONS

"Written Opinion with Search Report", Intellectual Property Office of Singapore, Sep. 1, 2025, pp. 1-9.

Ferrero, M. A. et al., "Characterization of the changes in the initial morphology for MgCl2-supported Ziegler-Natta polymerization catalysts", Journal of Polymer Science Part A: Polymer Chemistry, Sep. 1, 1992, vol. 30, No. 10, ISSN: 0887-624X; pp. 2131-2141.

Funako, Toshiki et al., "Alternation of pore architecture of Ziegler-Natta catalysts through modification of magnesium ethoxide", Macromolecular Reaction Engineering, Mar. 27, 2015, vol. 09, No. 04, ISSN: 1862-832X; pp. 325-332.

Wada, Toru et al., "Structure-performance relationship of Mg(OEt)2-based Ziegler-Natta catalysts", Journal of Catalysis, vol. 389, Sep. 2020, pp. 525-532.

MAGNESIUM-BASED SOLID AND CATALYST COMPONENT HAVING MULTIMODAL PORE DISTRIBUTION, AND PREPARATION METHODS THEREFOR

CROSS REFERENCE OF RELATED APPLICATIONS

This application is a U.S. national stage entry of PCT International Application No. PCT/CN2021/124050, filed on Oct. 15, 2021, which claims priority and benefit of CN202011104541.0, CN202011105894.2 and CN202011105648.7, filed on Oct. 15, 2020, the content of which are incorporated herein by reference in its entirety.

TECHNICAL FIELD

The present invention relates to the technical field of olefin polymerization, in particular to a magnesium-based solid substance and a catalyst component for olefin polymerization, and a preparation method and application thereof.

BACKGROUND ART

Magnesium chloride-supported Ziegler-Natta catalysts are the main olefin polymerization catalysts currently on the market. In the production of such catalysts, magnesium compound- or magnesium complex-containing solids can be prepared first as a carrier. For example, the well-known high-speed stirring technology, high-pressure extrusion technology, spray technology, supergravity technology, etc., are all used to prepare such a carrier, such as a magnesium chloride-alcohol adduct carrier. They are then brought into contact with a titanium-containing compound to form magnesium chloride-supported, titanium-based catalyst solids, on which an internal electron donor compound is then supported to form a catalyst component. Testing of such catalyst components by nitrogen adsorption generally shows a unimodal pore distribution with a most probable pore size no more than 10 nm.

In addition, it is also possible to obtain a solution of a magnesium compound or complex first, and then bring the solution into contact with a titanium-containing compound to precipitate magnesium chloride-supported, titanium-based catalyst solids, which are further contacted with an internal electron donor compound to form a catalyst component. No matter the catalyst components are prepared by the early published patents such as CN85100997A and CN1097597C, or the catalyst components are prepared by recently published patents such as CN103619475B and CN107207657A which have adopted emulsion technology to control the crystallization process, there is not a report on a magnesium chloride-supported catalyst component having a multimodal pore distribution.

At present, polyolefin catalysts with a multimodal pore distribution are generally prepared by using a molecular sieve or silica gel with multimodal pore distribution as a carrier. For example, patents CN104650267A, CN105175586A, CN105330769A and U.S. Pat. No. 5,231,066 report that by supporting titanium or a single active site metal on such a carrier to prepare polyethylene catalyst, polyethylene with bimodal or broad molecular weight distribution can be obtained. However, it is well known that, compared with magnesium chloride-supported catalysts, olefin polymerization catalysts prepared with molecular sieve- or silica gel-type supports have a relatively low activity.

In addition, in the case where the catalyst component is in an exposed-to-air state, when the structure of the catalyst will be cracked and the internal microporous structure will be destroyed so as to transform into mesopores and macropores, the magnesium chloride-supported catalyst component may also have a multimodal pore distribution. However, in such a case, the specific surface area of the catalyst component will decrease sharply or even disappear so that such catalyst components with multimodal pore distribution has a very small specific surface area and the catalysts can basically not work.

There remains a need for magnesium-based catalyst supports that exhibit desired properties, polyolefin catalyst components prepared therefrom, and corresponding catalyst systems.

SUMMARY OF THE INVENTION

A first object of the present invention is to provide a magnesium-based solid with multimodal pore distribution, which comprises a magnesium halide as a carrier, contains titanium element, and is featured by a multimodal pore size distribution in combination with a high specific surface area.

A second object of the present invention is to provide a method for preparing the magnesium-based solid associated with the first object.

A third object of the present invention is to provide a solid catalyst component for olefin polymerization prepared from the magnesium-based solid.

A fourth object of the present invention is to provide a method for preparing the solid catalyst component for olefin polymerization associated with the third object.

A fifth object of the present invention is to provide an olefin polymerization catalyst comprising the catalyst component.

A sixth object of the present invention is to provide the use of the catalyst in olefin polymerization.

A seventh object of the present invention is to provide an olefin polymerization method associated with the above object.

The inventors have found that when the olefin polymerization catalyst prepared by using the magnesium-based solid with multimodal pore distribution is used for propylene polymerization, it has higher polymerization activity and higher stereo-orientation ability, and the polymer prepared by using the catalyst of the present invention in propylene polymerization has a broader molecular weight distribution than those achieved by the known techniques using the same internal electron donor.

DETAILED DESCRIPTION OF PREFERRED EMBODIMENTS

In a first aspect, the present invention provides a magnesium-based solid with a multimodal pore distribution, which comprises a magnesium halide as a carrier and titanium element, wherein, as determined by a nitrogen adsorption method, the magnesium-based solid has a specific surface area of no less than 50 $m^2/g$ and a pore size distribution in a range of from 1 nm to 300 nm, wherein there are at least one peak within the pore size range of less than 10 nm and at least one peak within the pore size range of not less than 10 nm.

According to the present invention, the pore size distribution of the magnesium-based solid is obtained by measuring with nitrogen adsorption method and calculating with NLDFT algorithm.

According to the present invention, the specific surface area of the magnesium-based solid is obtained by measuring with nitrogen adsorption method.

According to some embodiments of the present invention, the magnesium-based solids have a spherical or spherical-like structure.

In some preferred embodiments of the present invention, the most probable pore size corresponding to the peak within the pore size range of less than 10 nm is in a range of from 2 nm to 8 nm, preferably from 2 nm to 6 nm; and at the same time, the most probable pore size corresponding to the peak within the pore size range of not less than 10 nm is in a range of from 15 nm to 200 nm, preferably from 20 nm to 100 nm, and more preferably from 30 nm to 90 nm.

In some preferred embodiments of the present invention, in the magnesium-based solids, the ratio of the pore volume of pores with a pore size of less than 10 nm to the pore volume of pores with a pore size of not less than 10 nm is (0.1-20):1, and preferably (0.25-15): 1.

In some preferred embodiments of the present invention, the pore volume of pores with a pore size of less than 5 nm accounts for 10% to 90% of the total pore volume, and preferably 15% to 70%; and the pore volume of pores with a pore size of not less than 30 nm accounts for 5% to 70% of the total pore volume, and preferably 10% to 60%.

In some preferred embodiments of the present invention, the magnesium-based solids have a specific surface area of from 100 $m^2/g$ to 500 $m^2/g$.

In a second aspect, the present invention provides a method for preparing the above-described magnesium-based solid, comprising:

S1. contacting a magnesium halide with a Lewis base in an organic solvent to form a magnesium-containing solution;

S2. contacting the magnesium-containing solution with an inert dispersion medium and a Lewis acid to form a mixture;

S3. in the presence of an auxiliary precipitant and a surfactant, precipitating the magnesium-based solid from the mixture, wherein, in step S1, the Lewis base includes an organic phosphorus compound, which is used in an amount of from 1.5 to 10 moles per mole of the magnesium halide; and in step S2, the Lewis acid includes a titanium compound.

In some preferred embodiments of the present invention, in step S1, the Lewis base includes an organic phosphorus compound, which is used in an amount of from 2 to 5 moles per mole of the magnesium halide.

According to the present invention, in step S2, the mixture is in the form of colloids, two-phase solutions, emulsions and others. Preferably, the mixture is formed into a mixture comprising at least two liquid phases. Thus, one or more processes such as vibration, stirring, atomization, shearing, etc., can be used to promote the formation of a uniform emulsion from the mixture in the presence of the surfactant, so that spherical solids can be solidified and precipitated.

In some preferred embodiments of the present invention, in step S3, the mixture is heated up to a target temperature to cause the precipitation of the magnesium-based solids from the mixture, wherein the target temperature ranges from 50 to 110° C.

In some preferred embodiments of the present invention, in step S3, after the heating-up process is completed, the target temperature is maintained for 0.1 to 24 h with stirring.

According to the present invention, after the precipitation of the solids from the mixture, the suspension can be stirred at a certain temperature for a certain period of time, such as 10 minutes to 24 hours, in order to make the precipitates more stable in morphology and improve the particle strength.

In some preferred embodiments of the present invention, in step S3, the heating-up process takes from 0.01 h to 36 h, and preferably from 0.1 h to 24 h.

According to the present invention, the process of heating-up the mixture is not particularly limited, and any known process for heating-up can be used, such as slowly, stepwise, rapidly or programmed heating-up. The specific heating-up manner can be adjusted according to the specific formulation, contact temperature, etc. The inventors have found through investigation that, in the preparation method described herein, when other conditions are the same, different heating-up processes will affect the particle morphology and particle size distribution of the final catalyst. Specifically, a better particle morphology can be obtained if a slow heating-up process is used, whereas a too fast heating rate will lead to a poor particle morphology. Therefore, the process of heating-up the mixture can last for 1 minute to 36 hours, and preferably 3 minutes to 24 hours.

In some preferred embodiments of the present invention, the magnesium halide used in step 51 is represented by the general formula (1):

$$MgX^1_2 \quad (1),$$

wherein $X^1$ is a halogen, preferably chlorine, bromine or iodine.

In some preferred embodiments of the present invention, the magnesium halide is one or more of magnesium dichloride, magnesium dibromide and magnesium diiodide.

In some preferred embodiments of the present invention, the magnesium halide is magnesium dichloride.

In some preferred embodiments of the present invention, the organic phosphorus compound is one or more selected from the compounds represented by formula (2) or formula (3):

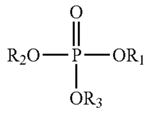
(2)

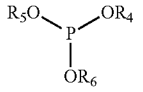
(3)

wherein $R^1$, $R^2$, $R^3$, $R^4$, $R^5$, $R^6$ each independently have 1-20 carbon atoms and are selected from linear or branched alkyl groups, cycloalkyl groups, aromatic hydrocarbon groups, and aromatic hydrocarbon groups having a substituent such as an alkyl group.

In some preferred embodiments of the present invention, the organic phosphorus compound is one or more of trimethyl phosphate, triethyl phosphate, tributyl phosphate, tripentyl phosphate, triphenyl phosphate, tris(o-, m- or p-tolyl) phosphate, trimethyl phosphite, triethyl phosphite, tributyl phosphite and tribenzyl phosphite.

According to the present invention, the organic phosphorus compound is tributyl phosphate.

In some preferred embodiments of the present invention, the organic solvent is one or more selected from aromatic hydrocarbon compounds and halogenated hydrocarbon compounds.

In some preferred embodiments of the present invention, the organic solvent is one or more of toluene, ethylbenzene, benzene, xylenes and chlorobenzene.

According to some preferred embodiments of the present invention, the organic solvent is toluene.

In some preferred embodiments of the present invention, the organic solvent is used in an amount of from 1 to 40 moles, and preferably from 2 to 30 moles, relative to one mole of the magnesium halide.

According to some embodiments of the present invention, the Lewis base further includes an organic epoxy compound and/or a hydroxyl-containing compound.

According to the present invention, the organic epoxy compound is one or more of the oxidation products of aliphatic olefins and halogenated aliphatic olefins with 2-8 carbon atoms, and specifically can be one or more of ethylene oxide, propylene oxide, epoxychloroethane, epichlorohydrin, butylene oxide, butadiene oxide, butadiene dioxide, methyl glycidyl ether and diglycidyl ether, preferably epichlorohydrin.

According to the present invention, the hydroxyl-containing compound has a general formula of HOR, wherein R is a hydrocarbon group having 2-20 carbon atoms, which can be a saturated or unsaturated, linear or branched alkyl group, a cycloalkyl group or an aromatic hydrocarbon group. The hydroxyl-containing compound is preferably an alcohol compound, and more preferably one or more of ethanol, propanol, butanol, 2-ethylhexanol, benzyl alcohol and phenethyl alcohol.

According to the present invention, the organic epoxy compound is used in an amount of from 0.1 to 10 moles, and preferably from 0.4 to 4 moles, relative to one mole of the magnesium halide.

According to the present invention, the hydroxyl-containing compound is used in an amount of from 0.1 to 10 moles, and preferably from 0.1 to 5 moles, relative to one mole of the magnesium halide.

According to the present invention, the magnesium-containing solution can be formed by contacting the magnesium halide and the organic phosphorus compound in the organic solvent; it can also be formed by contacting the magnesium halide, the organic epoxy compound and the organic phosphorus compound in the organic solvent; or it can also be formed by contacting the magnesium halide, the organic epoxy compound, the organic phosphorus compound, and the hydroxyl-containing compound in the organic solvent.

The contact process for forming the magnesium-containing solution described in the present invention is not particularly limited. The purpose of the contact is to form a magnesium-containing uniform solution. The conditions for the contact include: a contact temperature of from 10 to 150° C., preferably from 30 to 130° C., and a contact time of from 0.05 to 10 hours, preferably from 0.1 to 6 hours.

In some preferred embodiments of the present invention, in step S2, the inert dispersion medium is one or more selected from kerosenes, paraffin oils, white oils, vaseline oils, methyl silicone oils, aliphatic and cycloaliphatic hydrocarbons.

In some preferred embodiments of the present invention, in step S2, the inert dispersion medium is one or more selected from white oils, hexanes and decanes.

In some preferred embodiments of the present invention, in step S2, the amount of the inert dispersion medium used is from 0.1 g to 300 g, preferably from 1 g to 150 g, relative to one gram of the magnesium halide.

In some preferred embodiments of the present invention, the Lewis acid comprises a titanium-containing compound and optionally a silicon-containing compound, the titanium-containing compound being represented by the general formula (4):

$$TiX^2_m(OR^1)_{4-m} \quad (4)$$

wherein $X^2$ is a halogen, preferably chlorine, bromine or iodine, $R^1$ is a hydrocarbon group having 1-20 carbon atoms, and m is an integer of 1 to 4.

In some preferred embodiments of the present invention, the titanium-containing compound is one or more selected from titanium tetrachloride, titanium tetrabromide, titanium tetraiodide, titanium tetrabutoxide, titanium tetraethoxide, triethoxy titanium chloride, diethoxy titanium dichloride and ethoxy titanium trichloride.

In some preferred embodiments of the present invention, the titanium-containing compound is used in an amount of from 0.5 to 25 moles, preferably from 1 to 20 moles, relative to one mole of the magnesium halide.

In some preferred embodiments of the present invention, the silicon-containing compound is represented by the general formula (5):

$$SiX^3_nR^2_{4-n} \quad (5)$$

wherein $X^3$ is a halogen, preferably chlorine, bromine or iodine, $R^2$ is a hydrocarbon group having 1-carbon atoms, and n is an integer of from 1 to 4.

In some preferred embodiments of the present invention, the silicon-containing compound is silicon tetrachloride.

In some preferred embodiments of the present invention, the silicon-containing compound is used in an amount of from 0.1 to 40 moles, preferably from 0.1 to 20 moles, relative to one mole of the magnesium halide.

According to the present invention, in step S2, the contacting of the magnesium-containing solution, the inert dispersion medium and the Lewis acid to form a mixture can be carried out by any manner. For example, it is possible to contact the magnesium-containing solution with the inert dispersion medium first, and then add dropwise the Lewis acid thereto; it is also possible to contact the magnesium-containing solution with the Lewis acid first, and then add the inert dispersion medium thereto; alternatively, it is also possible to contact the inert dispersion medium with the Lewis acid, and then with the magnesium-containing solution.

In some preferred embodiments of the present invention, in step S3, the auxiliary precipitant is one or more selected from organic acids, organic acid anhydrides, organic ethers and organic ketones.

In some preferred embodiments of the present invention, in step S3, the auxiliary precipitant is one or more selected from acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether and dipentyl ether.

In some preferred embodiments of the present invention, in step S3, the amount of the auxiliary precipitant used is from 0.01 to 1 mole, preferably from 0.04 to 0.4 moles, relative to one mole of the magnesium halide.

In some preferred embodiments of the present invention, in step S3, the surfactant is a polymeric surfactant.

In some preferred embodiments of the present invention, in step S3, the surfactant is one or more selected from the group consisting of alkyl (meth)acrylate polymers, alkyl (meth)acrylate copolymers, alcoholysates of maleic anhydride polymers, and the alcoholysates of maleic anhydride copolymers.

In some preferred embodiments of the present invention, in step S3, the surfactant includes specifically at least one of alcoholysates of maleic anhydride polymers, alcoholysates of maleic anhydride-styrene copolymers, alcoholysates of maleic anhydride-styrene-alkyl (meth)acrylate terpolymers, alcoholysates of maleic anhydride-alkyl (meth)acrylate copolymers, wherein the alkyl chain in the alkyl (meth) acrylate is a chain of linear or branched alkanes, cycloalkanes or aromatic hydrocarbons with 1-30 carbon atoms, preferably 1-20 carbon atoms; the maleic anhydride copolymer refers to a copolymer comprising at least one maleic anhydride monomer; the alcoholysate refers to a polymeric product obtained by reacting the polymer in question with an alcohol compound having a structure formula of, for example, ROH, wherein R is a linear or branched alkyl, a cycloalkyl, or an aromatic hydrocarbyl, having 2 to 20 carbon atoms.

In some preferred embodiments of the present invention, the surfactant used in the present invention comprises at least one of alkyl (meth)acrylate polymers and alkyl (meth) acrylate copolymers, such as at least one of poly(alkyl (meth)acrylate)s, alkyl (meth)acrylate-maleic anhydride copolymers, and alkyl (meth)acrylate-maleic anhydride-styrene copolymers; wherein the ester side chains are chains of linear or branched alkanes, cycloalkanes or aromatic hydrocarbons with 1-30 carbon atoms, preferably 1-20 carbon atoms.

Various surfactants useful in the present invention are commercially available. For example, the poly(meth)acrylate polymer surfactants can be purchased from Guangzhou Ruishengyan Chemical Technology Co., Ltd. as pour point depressant products under the tradenames of T602, T632 and the like.

In the preparation method according to the present invention, the addition position of the surfactant may be any position in the preparation method, and the surfactant may be added in one or more parts. According to the present invention, the surfactant may be added in one or more parts during or after the formation of the magnesium-containing solution; in one part to the inert dispersion medium; in a part to the inert dispersion medium and in another part to the magnesium-containing solution; or after the magnesium-containing solution, the inert dispersion medium and the Lewis acid are contacted.

In step S3, if the surfactant, especially the above-mentioned surfactant, is not used, the resultant magnesium-based solid will be powdery, and no magnesium-based solid with spherical or spherical-like structure can be obtained.

In some preferred embodiments of the present invention, in step S3, the amount of the surfactant used is from 0.01 g to 5 g, preferably from 0.05 g to 1 g, relative to one gram of the magnesium halide.

In a third aspect, the present invention provides a solid catalyst component for olefin polymerization with a multimodal pore distribution, which comprises the above-described magnesium-based solid and at least one internal electron donor.

According to the present invention, as measured by the nitrogen adsorption method, the solid catalyst component has a pore size distribution exhibiting multiple peaks and a specific surface area of not less than 50 $m^2/g$; wherein the pore size distribution exhibiting multiple peaks of the solid is such that there are at least one peak in the pore size range of 1 nm to 100 nm and at least another peak in the pore size range of 5 nm to 200 nm.

Preferably, as measured by the nitrogen adsorption method, the solid catalyst component has a pore size distribution exhibiting multiple peaks and a specific surface area of not less than 50 $m^2/g$; wherein the pore size distribution exhibiting multiple peaks of the solid catalyst component is such that there are at least a first peak in the pore size range of 1 nm to 10 nm and at least a second peak in the pore size range of 10 nm to 200 nm.

According to the present invention, the pore size distribution is calculated by using the NLDFT algorithm on the data measured by the nitrogen adsorption method.

In some preferred embodiments of the present invention, the pore size distribution exhibiting multiple peaks of the solid catalyst component is such that the at least one peak in the pore size range of 1 nm-100 nm has a most probable pore size of from 1 nm to 50 nm, preferably from 1 nm to 10 nm, more preferably from 2 nm to 8 nm, and further preferably from 3 nm to 6 nm; and the at least another peak in the pore size range of 5 nm-200 nm has a most probable pore size of from 10 nm to 200 nm, preferably from 20 nm to 100 nm, and more preferably from 30 nm to 90 nm.

Preferably, the pore size distribution exhibiting multiple peaks of the solid catalyst component is such that the peak in the pore size range of 1 nm-10 nm has a most probable pore size of from 2 nm to 8 nm, and further preferably from 2 nm to 6 nm; and the peak in the pore size range of 10 nm-200 nm has a most probable pore size of from 15 nm to 200 nm, preferably from 20 nm to 100 nm, and more preferably from 30 nm to 90 nm.

In some preferred embodiments of the present invention, the pore volume of pores with a pore size of less than 5 nm accounts for 10% to 90%, preferably 15% to 70% of the total pore volume; and the pore volume of pores with a pore size of not less than 30 nm accounts for 5% to 70%, preferably 10% to 60% of the total pore volume.

In some preferred embodiments of the present invention, the solids have a specific surface area of not less than 100 $m^2/g$, and preferably not less than 150 $m^2/g$.

According to the present invention, the internal electron donor can be various internal electron donors commonly used in the art, preferably one or more selected from esters, ethers, ketones, amines, and silanes, preferably at least one of aliphatic mono- or poly-carboxylic acid esters, aromatic carboxylic acid esters, diol ester compounds and diether compounds, and preferably includes at least one of dibasic aliphatic carboxylic acid esters, aromatic carboxylic acid esters, diol esters and diether compounds.

Specific examples of internal electron donor compounds suitable for use in the present invention include, but are not limited to, diethyl phthalate, diisobutyl phthalate, di-n-butyl phthalate, diisooctyl phthalate, di-n-octyl phthalate, diethyl malonate, dibutyl malonate, diethyl adipate, dibutyl adipate, diethyl sebacate, dibutyl sebacate, diethyl maleate, di-n-butyl maleate, diethyl naphthalene dicarboxylate, dibutyl naphthalene dicarboxylate, triethyl trimellitate, tributyl trimellitate, triethyl 1,2,3-benzenetricarboxylate, tributyl 1,2,3-benzenetricarboxylate, tetraethyl pyromellitate, tetrabutyl pyromellitate, 1,3-propanediol dibenzoate, 2-methyl-1,3-propanediol dibenzoate, 2-ethyl-1,3-propanediol dibenzoate, 2-propyl-1,3-propanediol dibenzoate, 2-butyl-1,3-propanediol dibenzoate, 2,2-dimethyl-1,3-propanediol dibenzoate, 2-ethyl-2-butyl-1,3-propanediol dibenzoate, 2,2-diethyl-1,3-propanediol dibenzoate, 2-methyl-2-propyl-1,3-propanediol dibenzoate, 2-isopropyl-2-isopentyl-1,3-propanediol dibenzoate, 2,4-pentanediol dibenzoate, 3-methyl-2,4-pentanediol dibenzoate, 3-ethyl-2,4-pentanediol dibenzoate, 3-propyl-2,4-pentanediol dibenzoate, 3-butyl-2,4-pentanediol dibenzoate, 3,3-dimethyl-2,4-pentanediol dibenzoate, 2-methyl-1,3-pentanediol dibenzoate, 2,2-dimethyl-1,3-pentanediol dibenzoate, 2-ethyl-1,3-pentanediol dibenzoate, 2-butyl-1,3-pentanediol dibenzoate, 2-methyl-1,3-pentanediol dibenzoate, 2-ethyl-1,3-pentanediol dibenzoate, 2-propyl-1,3-pentanediol dibenzoate, 2-butyl-1,3-pentanediol dibenzoate, 2,2-dimethyl-1,3-pentanediol dibenzoate, 2-methyl-1,3-pentanediol dibenzoate, 2,2-dimethyl-1,3-pentanediol dibenzoate, 2-ethyl-1,3-pentanediol dibenzoate, 2-butyl-1,3-pentanediol dibenzoate, 2,2,4-trimethyl-1,3-pentanediol dibenzoate, 3-methyl-3-butyl-2,4-pentanediol dibenzoate, 2,2-dimethyl-1,5-pentanediol dibenzoate, 1,6-hexanediol dibenzoate, 6-heptene-2,4-diol dibenzoate, 2-methyl-6-heptene-2,4-diol dibenzoate, 3-methyl-6-heptene-2,4-diol dibenzoate, 4-methyl-6-heptene-2,4-diol dibenzoate, 5-methyl-6-heptene-2,4-diol dibenzoate, 6-methyl-6-heptene-2,4-diol dibenzoate, 3-ethyl-6-heptene-2,4-diol dibenzoate, 4-ethyl-6-heptene-2,4-diol dibenzoate, 5-ethyl-6-heptene-2,4-diol dibenzoate, 6-ethyl-6-heptene-2,4-diol dibenzoate, 3-propyl-6-heptene-2,4-diol dibenzoate, 4-propyl-6-heptene-2,4-diol dibenzoate, 5-propyl-6-heptene-2,4-diol dibenzoate, 6-propyl-6-heptene-2,4-diol dibenzoate, 3-butyl-6-heptene-2,4-diol dibenzoate, 4-butyl-6-heptene-2,4-diol dibenzoate, 5-butyl-6-heptene-2,4-diol dibenzoate, 6-butyl-6-heptene-2,4-diol dibenzoate, 3,5-dimethyl-6-heptene-2,4-diol dibenzoate, 3,5-diethyl-6-heptene-2,4-diol dibenzoate, 3,5-dipropyl-6-heptene-2,4-diol dibenzoate, 3,5-dibutyl-6-heptene-2,4-diol dibenzoate, 3,3-dimethyl-6-heptene-2,4-diol dibenzoate, 3,3-diethyl-6-heptene-2,4-diol dibenzoate, 3,3-dipropyl-6-heptene-2,4-diol dibenzoate, 3,3-dibutyl-6-heptene-2,4-diol dibenzoate, 3,5-heptanediol dibenzoate, 2-methyl-3,5-heptanediol dibenzoate, 3-methyl-3,5-heptanediol dibenzoate, 4-methyl-3,5-heptanediol dibenzoate, 5-methyl-3,5-heptanediol dibenzoate, 6-methyl-3,5-heptanediol dibenzoate, 3-ethyl-3,5-heptanediol dibenzoate, 4-ethyl-3,5-heptanediol dibenzoate, 5-ethyl-3,5-heptanediol dibenzoate, 3-propyl-3,5-heptanediol dibenzoate, 4-propyl-3,5-heptanediol dibenzoate, 3-butyl-3,5-heptanediol dibenzoate, 2,3-dimethyl-3,5-heptanediol dibenzoate, 2,4-dimethyl-3,5-heptanediol dibenzoate, 2,5-dimethyl-3,5-heptanediol dibenzoate, 2,6-dimethyl-3,5-heptanediol dibenzoate, 3,3-dimethyl-3,5-heptanediol dibenzoate, 4,4-dimethyl-3,5-heptanediol dibenzoate, 6,6-dimethyl-3,5-heptanediol dibenzoate, 2,6-dimethyl-3,5-heptanediol dibenzoate, 3,4-dimethyl-3,5-heptanediol dibenzoate, 3,5-dimethyl-3,5-heptanediol dibenzoate, 3,6-dimethyl-3,5-heptanediol dibenzoate, 4,5-dimethyl-3,5-heptanediol dibenzoate, 4,6-dimethyl-3,5-heptanediol dibenzoate, 4,4-dimethyl-3,5-heptanediol dibenzoate, 6,6-dimethyl-3,5-heptanediol dibenzoate, 2-methyl-3-ethyl-3,5-heptanediol dibenzoate, 2-methyl-4-ethyl-3,5-heptanediol dibenzoate, 2-methyl-dibenzoate, 3-methyl-3-ethyl-3,5-heptanediol dibenzoate, 3-methyl-4-ethyl-3,5-heptanediol dibenzoate, 3-methyl-5-ethyl-3,5-heptanediol dibenzoate, 4-methyl-3-ethyl-3,5-heptanediol dibenzoate, 4-methyl-4-ethyl-3,5-heptanediol dibenzoate, 4-methyl-5-ethyl-3,5-heptanediol dibenzoate, 2-methyl-3-propyl-3,5-heptanediol dibenzoate, 2-methyl-4-propyl-3,5-heptanediol dibenzoate, 2-methyl-5-propyl-3,5-heptanediol dibenzoate, 3-methyl-3-propyl-3,5-heptanediol dibenzoate, 3-methyl-4-propyl-3,5-heptanediol dibenzoate, 3-methyl-5-propyl-3,5-heptanediol dibenzoate, 4-methyl-3-propyl-3,5-heptanediol dibenzoate, 4-methyl-4-propyl-3,5-heptanediol dibenzoate, 4-methyl-5-propyl-3,5-heptanediol dibenzoate, 2-(2-ethylhexyl)-1,3-dimethoxypropane, 2-isopropyl-1,3-dimethoxypropane, 2-butyl-1,3-dimethoxypropane, 2-secbutyl-1,3-dimethoxypropane, 2-cyclohexyl-1,3-dimethoxypropane, 2-phenyl-1,3-dimethoxypropane, 2-(2-phenyl ethyl)-1,3-dimethoxypropane, 2-(2-cyclohexylethyl)-1,3-dimethoxypropane, 2-(p-chlorophenyl)-1,3-dimethoxypropane, 2-diphenylmethyl-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(2-cyclohexyl ethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2-isobutyl-2-isopropyl-1,3-dimethoxypropane, 2-(1-methylbutyl)-2-isopropyl-1,3-dimethoxypropane, 2-isopropyl-2-isopentyl-1,3-dimethoxypropane, 2-phenyl-2-isopropyl-1,3-dimethoxypropane, 2-phenyl-2-sec-butyl-1,3-dimethoxypropane, 2-benzyl-2-isopropyl-1,3-dimethoxypropane, 2-cyclopentyl-2-isopropyl-1,3-dimethoxypropane, 2-cyclopentyl-2-sec-butyl-1,3-dimethoxypropane, 2-cyclohexyl-2-isopropyl-1,3-dimethoxypropane, 2-cyclohexyl-2-sec-butyl-1,3-dimethoxypropane, 2-isopropyl-2-sec-butyl-1,3-dimethoxypropane, 2-cyclohexyl-2-cyclohexylmethyl-1,3-dimethoxypropane, 9,9-dimethoxymethylfluorene, ethylene glycol dimethyl ether, ethylene glycol diethyl ether, ethylene glycol dibutyl ether, butylene glycol dimethyl ether, butylene glycol diethyl ether, butylene glycol dibutyl ether, hexanediol dimethyl ether, hexanediol diethyl ether, hexanediol dibutyl ether, diethyl 2,2-dimethylsuccinate, diethyl 2-ethyl-2-methylsuccinate, diethyl 2-benzyl-2-isopropylsuccinate, diethyl 2-cyclohexylmethyl-2-isobutylsuccinate, diethyl 2-cyclopentyl-2-n-butylsuccinate, diethyl 2,2-diisobutylsuccinate, diethyl 2-cyclohexyl-2-ethyl succinate, diethyl 2-isopropyl-2-methylsuccinate, diethyl 2-tetradecyl-2-ethyl succinate, diethyl 2-isobutyl-2-ethyl succinate, diethyl 2-(1-trifluoromethyl-ethyl)-2-methylsuccinate, diethyl 2-isopentyl-2-isobutylsuccinate, diethyl 2-phenyl-2-n-butylsuccinate, diisobutyl 2,2-dimethylsuccinate, diisobutyl 2-ethyl-2-methylsuccinate, diisobutyl 2-benzyl-2-isopropylsuccinate, diisobutyl 2-cyclohexylmethyl-2-isobutylsuccinate, diisobutyl 2-cyclopentyl-2-n-butylsuccinate, diisobutyl 2,2-diisobutylsuccinate, diisobutyl 2-cyclohexyl-2-ethyl succinate, diisobutyl 2-isopropyl-2-methylsuccinate, diisobutyl 2-tetradecyl-2-ethyl succinate, diisobutyl 2-isobutyl-2-ethyl succinate, diisobutyl 2-(1-trifluoromethyl-ethyl)-2-methylsuccinate, diisobutyl 2-isopentyl-2-isobutylsuccinate, diisobutyl 2-phenyl-2-n-butylsuccinate, dineopentyl 2,2-dimethylsuccinate, dineopentyl 2-ethyl-2-methylsuccinate, dineopentyl 2-benzyl-2-isopropylsuccinate, dineopentyl 2-cyclohexylmethyl-2-isobutylsuccinate, dineopentyl 2-cyclopentyl-2-n-butylsuccinate, dineopentyl 2,2-diisobutylsuccinate, dineopentyl 2-cyclohexyl-2-ethylsuccinate, dineopentyl 2-isopropyl-2-methylsuccinate, dineopentyl 2-tetradecyl-2-ethylsuccinate, dineopentyl 2-isobutyl-2-ethylsuccinate, dineopentyl 2-(1-trifluoromethyl-ethyl)-2-methylsuccinate, dineopentyl 2-isopentyl-2-isobutylsuccinate, dineopentyl 2-phenyl-2-n-butylsuccinate, diethyl 2,3-bis(trimethylsilyl)succinate, diethyl 2,2-sec-butyl-3-methylsuccinate, diethyl 2-(3,3,3-trifluoropropyl)-3-methylsuccinate, diethyl 2,3-bis(2-ethyl-butyl)succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-dibenzyl succinate, diethyl 2,3-diisopropylsuccinate, diethyl 2,3-bis(cyclohexylmethyl)succinate, diethyl 2,3-di-tert-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2,3-tetradecylsuccinate, diethyl 2,3-fluorenylsuccinate, diethyl 2-isopropyl-3-isobutylsuccinate, diethyl 2-tert-butyl-3-isopropylsuccinate, diethyl 2-isopropyl-3-cyclohexylsuccinate, diethyl 2-isopentyl-3-cyclohexylsuccinate, diethyl 2-tetradecyl-3-cyclohexylmethylsuccinate, diethyl 2-cyclohexyl-3-cyclopentylsuccinate, diisobutyl 2,3-diethyl-2-isopropylsuccinate, diisobutyl 2,3-diisopropyl-2-methylsuccinate, diisobutyl 2,3-di cyclohexyl-2-methylsuccinate, diisobutyl 2,3-dibenzyl succinate, diisobutyl 2,3-diisopropylsuccinate, diisobutyl 2,3-bis(cyclohexylmethyl)succinate, diisobutyl 2,3-di-tert-butylsuccinate, diisobutyl 2,3-diisobutyl succinate, diisobutyl 2,3-dineopentylsuccinate, diisobutyl 2,3-diisopentylsuccinate, diisobutyl 2,3-(1-trifluoromethyl-ethyl)succinate, diisobutyl 2,3-tetradecylsuccinate, diisobutyl 2,3-fluorenylsuccinate, diisobutyl 2-isopropyl-3-isobutylsuccinate, diisobutyl 2-tert-butyl-3-isopropylsuccinate, diisobutyl 2-isopropyl-3-cyclohexylsuccinate, diisobutyl 2-isopentyl-3-cyclohexylsuccinate, diisobutyl 2-tetradecyl-3-cyclohexylmethylsuccinate, diisobutyl 2-cyclohexyl-3-cyclopentylsuccinate, dineopentyl 2,3-bis(trimethyl silyl)succinate, dineopentyl 2,2-sec-butyl-3-methylsuccinate, dineopentyl 2-(3,3,3-trifluoropropyl)-3-methylsuccinate, dineopentyl 2,3-bis(2-ethyl-butyl) succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-di-tert-butylsuccinate, dineopentyl 2,3-diisobutylsuccinate, dineopentyl 2,3-dineopentylsuccinate, dineopentyl 2,3-diisopentylsuccinate, dineopentyl 2,3-(1-trifluoromethyl-ethyl)succinate, dineopentyl 2,3-tetradecylsuccinate, dineopentyl 2,3-fluorenylsuccinate, dineopentyl 2-isopropyl-3-isobutylsuccinate, dineopentyl 2-tert-butyl-3-isopropylsuccinate, dineopentyl 2-isopropyl-3-cyclohexylsuccinate, dineopentyl 2-isopentyl-3-cyclohexylsuccinate, dineopentyl 2-tetradecyl-3-cyclohexylmethylsuccinate, dineopentyl 2-cyclohexyl-3-cyclopentyl succinate.

Further, preferred internal electron donors are at least one of di-n-butyl phthalate, diisobutyl phthalate, 2,4-pentanediol dibenzoate, 3,5-heptanediol dibenzoate, diethyl 2,3-diisopropylsuccinate, diisobutyl 2,3-diisopropylsuccinate, di-n-butyl 2,3-diisopropylsuccinate, dimethyl 2,3-diisopropylsuccinate, diisobutyl 2,2-dimethylsuccinate, diisobutyl 2-ethyl-2-methylsuccinate, diethyl 2-ethyl-2-methylsuccinate, 2-isopropyl-2-isopentyl-1,3-dimethoxypropane, 9,9-dimethoxymethylfluorene, ethylene glycol dibutyl ether.

According to the present invention, the addition amount of the internal electron donor is not particularly limited, and it can be ones conventionally used in the art. Preferably, the molar ratio of the internal electron donor to the magnesium halide is 0.001-1:1, and preferably 0.01-1:1.

In a fourth aspect, the present invention provides a method for preparing a solid catalyst component for olefin polymerization, including:

method 1, where at least one internal electron donor is added during the preparation of the above-described magnesium-based solid to obtain the solid catalyst component for olefin polymerization; or method 2, where at least one internal electron donor is added during the preparation of the above-described magnesium-based solid, and the precipitated solids continue to contact with at least one internal electron donor to obtain the solid catalyst component for olefin polymerization; or method 3, where at least one internal electron donor is contacted with the above-described magnesium-based solid to obtain the solid catalyst component for olefin polymerization.

According to the present invention, in the method 1 and the method 2, the internal electron donor can be added at any timing in the preparation process of the magnesium-based solid and in one or more parts.

According to the present invention, the timing, at which the internal electron donor is added in the method 1 and the method 2, includes that the internal electron donor is added in one or more parts to the magnesium-containing homogeneous solution in step S1, and that the internal electron donor is added in one or more parts after the mixture in step S2 is formed and in the process of precipitation by heating-up in step S3.

In a fifth aspect, the present invention provides a catalyst system for olefin polymerization, comprising:

(1) the above-described solid catalyst component;

(2) an alkyl aluminum compound; and (3) optionally, an external electron donor.

In some preferred embodiments of the present invention, the molar ratio of aluminum in the aluminum alkyl compound to titanium in the solid catalyst component is (5-5000):1, preferably (20-800):1.

In some preferred embodiments of the present invention, the molar ratio of the alkylaluminum compound in terms of aluminum to the external electron donor compound is (0.1-500):1, preferably (1-100):1, and more preferably (3-100):1.

According to some preferred embodiments of the present invention, the alkylaluminum compound is a compound represented by the general formula $AlR_nX_{3-n}$, wherein R is hydrogen, a hydrocarbon group with 1-20 carbon atoms, especially alkyl, aralkyl, aryl group, etc.; X is a halogen, and n is an integer of 1-3. Specifically, it can be at least one of trimethylaluminum, triethylaluminum, triisobutylaluminum, trioctylaluminum, diethylaluminum hydride, diisobutylaluminum hydride, diethylaluminum chloride, diisobutylaluminum chloride, sesquiethylaluminum chloride and ethylaluminum dichloride, preferably triethylaluminum and/or triisobutylaluminum.

According to the present invention, the external electron donor compound is preferably an organosilicon compound. In some embodiments, the organosilicon compound is represented by a general formula of $R_nSi(OR_y)_{4-n}$, wherein n is an integer of from 0 to 3, R is one or more of alkyl, cycloalkyl, aryl, halogenated alkyl, halogen and hydrogen, and Ry is one or more of alkyl, cycloalkyl, aryl and halogenated alkyl; preferably, the organosilicon compound is at least one of trimethylmethoxysilane, trimethylethoxysilane, trimethylphenoxysilane, dimethyldimethoxysilane, dimethyldiethoxysilane, methyltert-butyldimethoxysilane, diphenyldimethoxysilane, diphenyldiethoxysilane, dicyclohexyldimethoxysilane, phenyltrimethoxysilane, phenyltriethoxysilane, vinyltrimethoxysilane, methylcyclohexyldimethoxysilane, dicyclopentyldimethoxysilane, 2-ethylpiperidinyl-2-tert-butyldimethoxysilane, (1,1,1-trifluoro-2-propyl)-2-ethylpiperidinyldimethoxysilane and (1,1,1-trifluoro-2-propyl)-methyldimethoxysilane, preferably methylcyclohexyldimethoxysilane.

In a sixth aspect, the present invention provides use of the above-described solid catalyst component or the above-described catalyst system in an olefin polymerization reaction.

According to the present invention, the olefin polymerization catalyst of the present invention can be used for the homopolymerization of an olefin or copolymerization of multiple olefins. At least one of the olefins is represented by the formula $CH_2{=}CHR$, wherein R is hydrogen or a $C_1$-$C_6$ linear or branched alkyl. Specific examples of the olefin represented by the formula $CH_2{=}CHR$ may include ethylene, propylene, 1-n-butene, 1-n-pentene, 1-n-hexene, 1-n-octene, and 4-methyl-1-pentene. Preferably, the olefin represented by the formula $CH_2{=}CHR$ is one or more of ethylene, propylene, 1-n-butene, 1-n-hexene and 4-methyl-1-pentene. More preferably, the olefin represented by the formula $CH_2{=}CHR$ is propylene, or a combination of propylene and other olefin(s).

In some preferred embodiments, the present invention provides use of the above-described solid catalyst component or the above-described catalyst system in the polymerization of propylene.

In a seventh aspect, the present invention provides a method for olefin polymerization, comprising polymerizing an olefin in the presence of the above-described solid catalyst component or the above-described catalyst system.

According to the present invention, the olefin polymerization is carried out according to known processes, in liquid phase of a liquid phase monomer or a solution of a monomer in an inert solvent, or in gas phase, or by a combined polymerization process in gas phase and liquid phase.

In some preferred embodiments of the present invention, the conditions for the polymerization reaction include a temperature of from 0 to 150° C., preferably from 60 to 100° C. and a pressure of from 0.1 to 10.0 MPa.

The beneficial effects of the present invention include at least the followings: the solid catalyst component has unique multimodal pore distribution characteristics, and the polymer prepared by using the catalyst of the present invention in propylene polymerization has a wider molecular weight distribution.

EXAMPLES

The present invention will be illustrated in detail below by way of examples, but the protection scope of the present invention is not limited to the following description.

If the specific conditions are not indicated in the examples, it is carried out according to the conventional conditions or the conditions suggested by the manufacturer. The reagents or instruments used without the manufacturer's indication are conventional products that can be obtained through commercial channels.

In the following examples, the test methods involved are as follows:

1. Determination of titanium content in catalyst: colorimetric determined by using UV-Vis spectrophotometer model 722.
2. Determination of magnesium content in catalyst: measured by complexometric titration between magnesium ion and EDTA.
3. Particle size distribution of magnesium-containing carrier or catalyst: measured by laser diffraction method, using Malvern 2000 particle size analyzer and n-hexane as a dispersant.
4. Determination of the content of the internal electron donor compound in catalyst: after the catalyst dry powder is decomposed by a dilute acid (such as dilute sulfuric acid, etc.), the internal electron donor compound is extracted with an extractant (such as hexane, etc.) and then determined by chromatography, with an ether-type electron donor being determined by using Agilent 6890N gas chromatograph, and an ester-type electron donor being determined by using Waters 600E high performance liquid chromatography.
5. Specific surface area and pore size distribution of magnesium-containing carrier or catalyst: determined by nitrogen adsorption method with ASAP 2460 specific surface area and porosity analyzer from Micromeritics, USA.
6. Determination of polymer bulk density (BD): according to ASTM D1895-96 standard.
7. Isotacticity index (II) of propylene polymer: determined by heptane extraction method carried out as follows: 2 grams of dry polymer sample were extracted with boiling heptane in an extractor for 6 hours, then the residual substance was dried to constant weight, and the ratio of the weight of the residual polymer (g) to 2 (g) was regarded as isotacticity.
8. Molecular weight distribution MWD (MWD=Mw/Mn) of polymer: determined by using PL-GPC220 with trichlorobenzene as solvent at 150° C. (standards: polystyrene, flow rate: 1.0 ml/min, columns: 3×Plgel 10 μm M1xED-B 300×7.5 nm).
9. Melt flow index (MI) of polymer: determined by using MI-4 melt flow index instrument from GOTTFERT company, German, according to the GB/T 3682.1-2018 standard.

The examples given below are intended to illustrate the present invention, but not to limit the present invention.

Example 1

Example 1 is used to illustrate the preparation of a magnesium-based solid.

Figure 7:
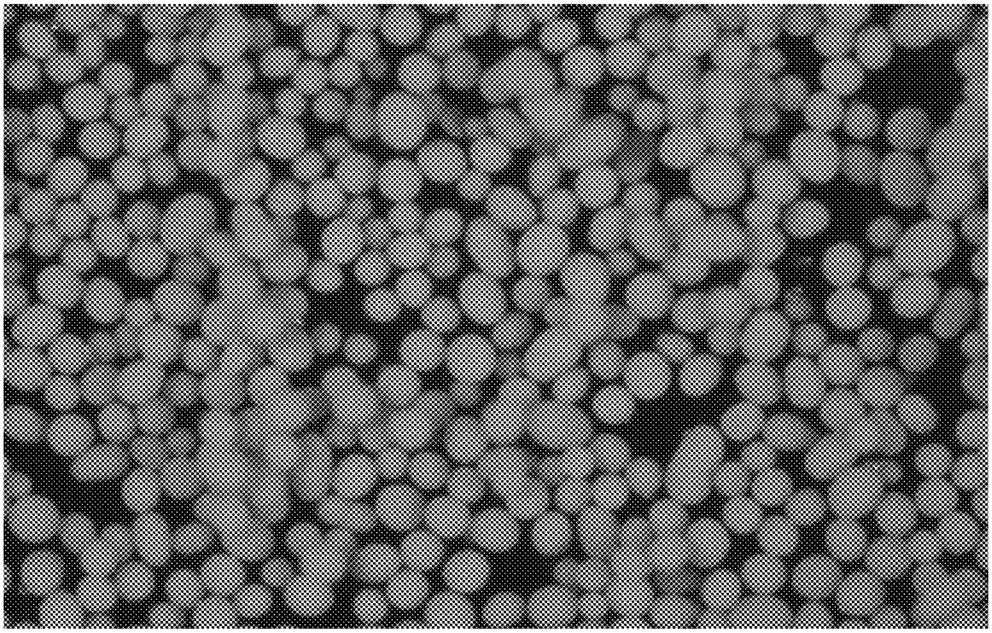
FIG. 7 shows a microscope image of the magnesium-based solid prepared in Example 1.

To a reactor, in which air had been repeatedly replaced with high-purity nitrogen, 10.86 g of anhydrous magnesium chloride, 249 mL of toluene, 10.75 g of epichlorohydrin, and 70.7 g of tributyl phosphate were successively added, and the contents were maintained at 60° C. under the stirring of 300 rpm for 2 hours. Then, 2.56 g of phthalic anhydride was added, and the contents were maintained at 60° C. for an additional hour. The solution was cooled to 14° C. In advance, 2.1 g of surfactant (an alcoholysate of maleic anhydride-methacrylate copolymer, which is commercially available from Guangzhou Ruishengyan Chemical Technology Co., Ltd. under the tradename T632) and 220 ml of food-grade No. 100 white oil (having a kinematic viscosity at 40° C. of 100 $mm^2/s$) were mixed uniformly to form mixture A. 151 ml of titanium tetrachloride and the mixture A were simultaneously added dropwise thereto over 40 min. After the dropwise addition was completed, the contents were stirred at 400 rpm for 1 hour. The temperature was then gradually increased to 80° C. over 3 hours, and the mother liquor was then filtered off. The residual solids were washed twice with hot toluene, then twice with hexane, and dried to obtain a titanium-containing, magnesium-based solid. The obtained solid had an average particle diameter D50 of 34.2 μm, a SPAN value (i.e., (D90−D10)/D50) of 0.60, a titanium content of 2.0% by weight, and a Mg content of 20.3% by weight. A micrograph of the solid is shown in FIG. 7.

Figure 1:
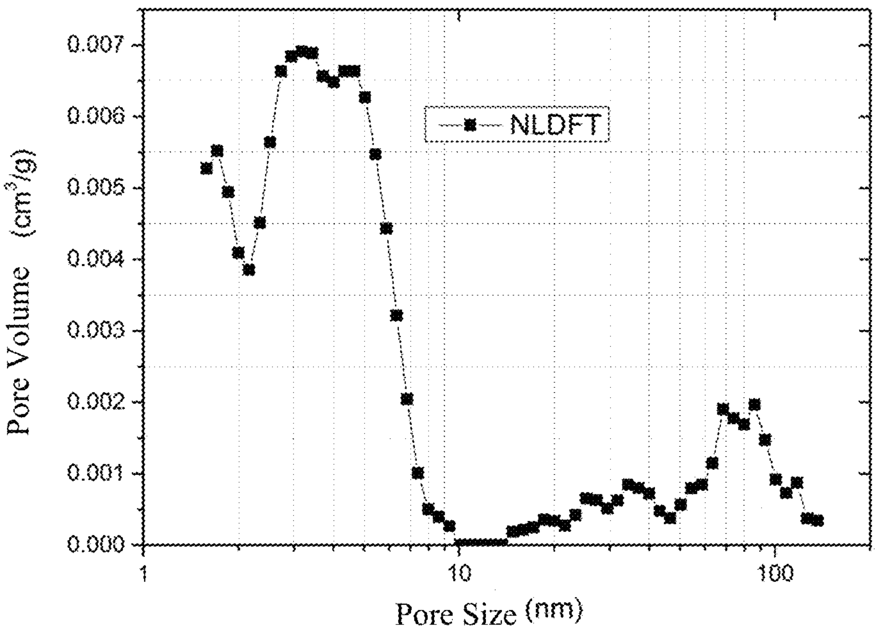
FIG. 1 shows the pore size distribution diagram of the magnesium-based solid prepared in Example 1, measured by nitrogen adsorption method and calculated by NLDFT algorithm.

The pore size distribution diagram of the solid, measured by nitrogen adsorption method and calculated by the NLDFT algorithm, is shown in FIG. 1. It can be seen from FIG. 1 that the pore size distribution is shown as a multimodal pore size distribution, including at least one peak in a pore size range below 10 nm and at least another peak in a pore size range of not less than 10 nm.

The pore size data of the solid measured by nitrogen adsorption method are given in Table 1.

Example 2

Example 2 is used to illustrate the preparation of a magnesium-based solid.

To a reactor, in which air had been repeatedly replaced with high-purity nitrogen, 10.86 g of anhydrous magnesium chloride, 194 mL of toluene, 10.75 g of epichlorohydrin, and 75.12 g of tributyl phosphate were successively added, and the contents were maintained at 60° C. with stirring for 2 hours. Then, 3.2 g of phthalic anhydride was added, and the contents were maintained at 60° C. for an additional hour. The solution was cooled to 24° C., and 2.5 g of surfactant (an alcoholysate of maleic anhydride-methacrylate copolymer, which is commercially available from Guangzhou Ruishengyan Chemical Technology Co., Ltd. under the tradename T632) diluted in 40 ml of toluene was then added thereto. The contents were continuously stirred for 1 hour, and 136 ml of titanium tetrachloride and 240 ml of food-grade No. 100 white oil (having a kinematic viscosity at 40° C. of 100 $mm^2/s$) were then simultaneously added dropwise thereto over 40 min. After the dropwise addition was completed, the contents were stirred at 400 rpm for 1 hour. The temperature was then gradually increased to 80° C., and the mother liquor was then filtered off. The residual solids were washed twice with hot toluene, then twice with hexane, and dried to obtain a titanium-containing, magnesium-based solid. The obtained solid had an average particle diameter D50 of 62.1 μm, a SPAN value of 0.63, a titanium content of 2.3% by weight, and a Mg content of 21.1% by weight.

Figure 2:
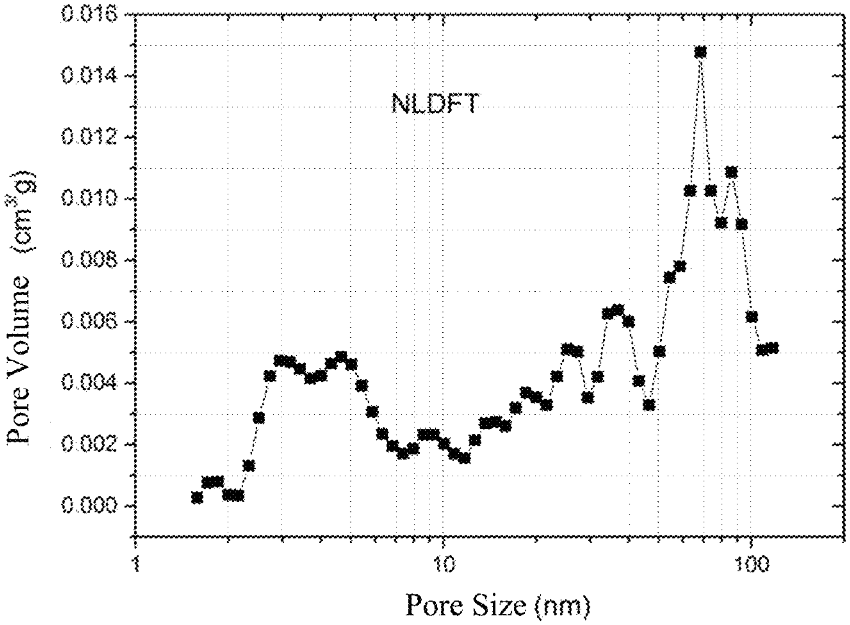
FIG. 2 shows the pore size distribution diagram of the magnesium-based solid prepared in Example 2, measured by nitrogen adsorption method and calculated by NLDFT algorithm.

The pore size distribution diagram of the solid, measured by nitrogen adsorption method and calculated by the NLDFT algorithm, is shown in FIG. 2. It can be seen from FIG. 2 that the pore size distribution is shown as a multimodal pore size distribution, including at least one peak in a pore size range below 10 nm and at least another peak in a pore size range of not less than 10 nm.

The pore size data of the solid measured by nitrogen adsorption method are given in Table 1.

Example 3

A magnesium-based solid was prepared by the method described in Example 1, except that the amount of the epichlorohydrin used was changed to 14.2 g, the amount of the tributyl phosphate used was changed to 53.2 g, the amount of the toluene used was changed to 197 ml, and the amount of the titanium tetrachloride used was changed to 133 ml, and that after the addition of the phthalic anhydride and the maintaining at 60° C. for an additional hour, the solution was cooled to 8° C. The resulting solid had a titanium content of 2.1% by weight and a Mg content of 21.2% by weight.

Figure 3:
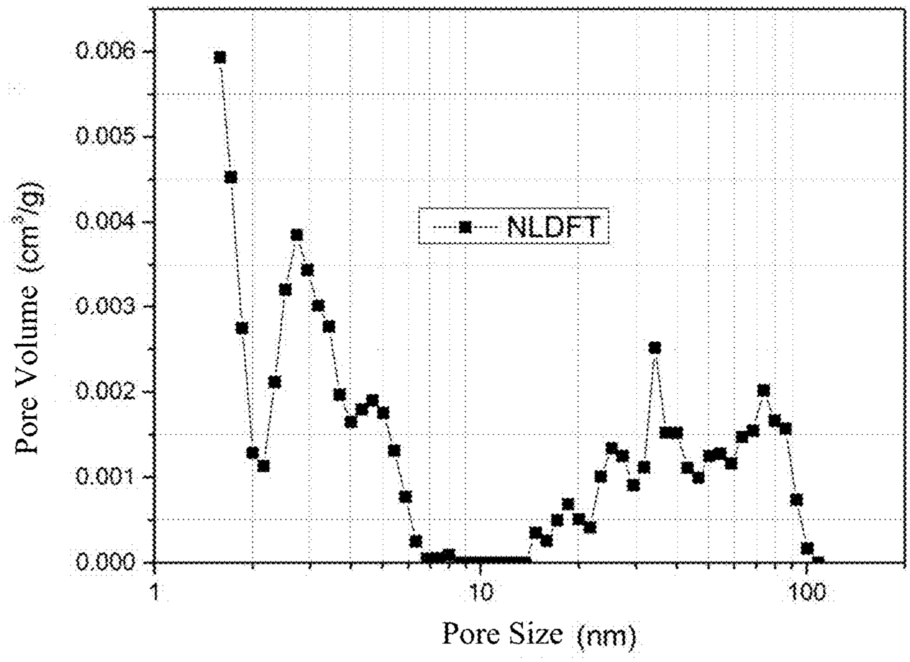
FIG. 3 shows the pore size distribution diagram of the magnesium-based solid prepared in Example 3, measured by nitrogen adsorption method and calculated by NLDFT algorithm.

The pore size distribution diagram of the solid, measured by nitrogen adsorption method and calculated by the NLDFT algorithm, is shown in FIG. 3. It can be seen from FIG. 3 that the pore size distribution is shown as a multimodal pore size distribution, including at least one peak in a pore size range below 10 nm and at least another peak in a pore size range of not less than 10 nm.

The pore size data of the solid measured by nitrogen adsorption method are given in Table 1.

Example 4

A magnesium-based solid was prepared by the method described in Example 1, except that the amount of the epichlorohydrin used was changed to 7.2 g and the amount of the tributyl phosphate used was changed to 65.1 g, that the addition of the tributyl phosphate was followed by the addition of 2.2 g of ethanol, that the amount of the white oil used was changed to 184 ml and the amount of the titanium tetrachloride used was changed to 203 ml, and that after the addition of the phthalic anhydride and the maintaining at 60° C. for an additional hour, the solution was cooled to 0° C. The resulting solid had a titanium content of 3.6% by weight and a Mg content of 20.2% by weight.

The pore size data of the solid measured by nitrogen adsorption method are given in Table 1, and the pore size distribution is a multimodal pore size distribution.

Example 5

A titanium-containing, magnesium-based solid was prepared by the method described in Example 1, except that the amount of the epichlorohydrin used was 10.75 g, the amount of the tributyl phosphate used was changed to 33.2 g, the amount of the toluene used was changed to 72 ml, the amount of the white oil used was changed to 120 ml, and the amount of the titanium tetrachloride used was changed to 112 ml, and that after the addition of the phthalic anhydride and the maintaining at 60° C. for an additional hour, the solution was cooled to 0° C. The resulting solid had a titanium content of 2.6% by weight and a Mg content of 21.4% by weight.

The pore size data of the solid measured by nitrogen adsorption method are given in Table 1, and the pore size distribution is a unimodal pore size distribution.

Comparative Example 1

A solid was prepared by the preparation method described in Example 1 in patent CN107207657A, except that the surfactant VISCOPLEX was changed to the surfactant used in Example 1 of the present invention. The obtained solid had an average particle diameter D50 of 27.1 μm, a SPAN value of 1.24, a titanium content of 2.1% by weight, and a Mg content of 20.2% by weight.

Figure 4:
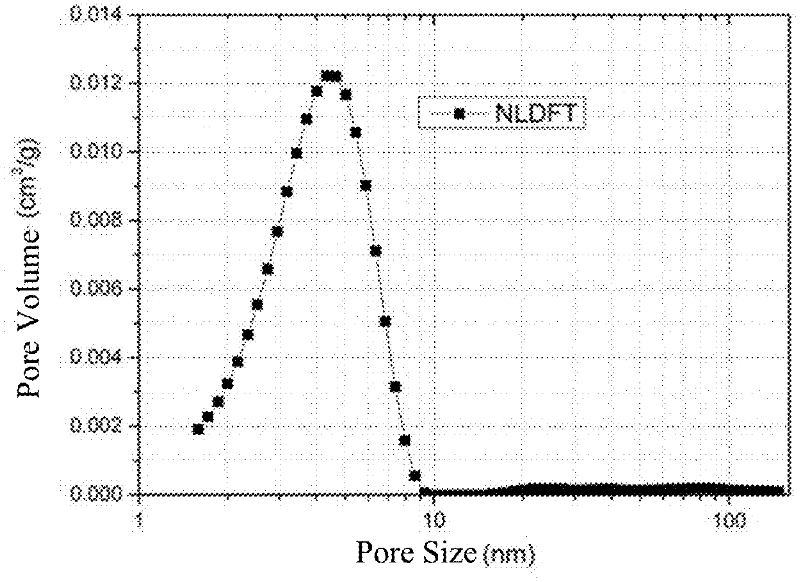
FIG. 4 shows the pore size distribution diagram of the magnesium-based solid prepared in Comparative Example 1, measured by nitrogen adsorption method and calculated by NLDFT algorithm.

The pore size data of the solid measured by nitrogen adsorption method are given in Table 1, and the pore size distribution diagram is shown in FIG. 4, which is a unimodal pore size distribution. FIG. 4 is a pore size distribution diagram using the NLDFT algorithm.

Comparative Example 2

A solid was prepared by the preparation method described in Example 1 in patent CN1097597C, except that the electron donor diisobutyl phthalate was not added and the subsequent steps were conducted as follows: after the precipitation of the solids, the mother liquor was filtered off, and the solids were washed with hot toluene twice, then with hexane twice, and dried to obtain a titanium-containing, magnesium-based solid. The obtained solid had an average particle diameter D50 of 24.1 μm, a SPAN value of 1.14, a titanium content of 2.3% by weight, and a Mg content of 21.1% by weight.

The pore size data of the solid measured by nitrogen adsorption method are given in Table 1, and the pore size distribution is a unimodal pore size distribution.

food-grade No. 100 white oil (having a kinematic viscosity at 40° C. of 100 $mm^2/s$) were mixed uniformly to form mixture 1. 151 ml of titanium tetrachloride and the mixture 1 were simultaneously added dropwise thereto over 40 min. After the dropwise addition was completed, the contents were stirred at 400 rpm for 1 hour. The temperature was then gradually increased to 80° C. over 3 hours, 3 mL of di-n-butyl phthalate as an electron donor was then added thereto, and the temperature was raised to 85° C. and then kept constant for 1 hour. After filtration, the residual solids were washed twice with hot toluene. Next, 80 mL of titanium tetrachloride and 120 mL of toluene were added thereto, and the contents were maintained at a constant temperature of 110° C. for 0.5 hours and then filtered, and the operation was repeated once. Then, the obtained solids were washed 5 times with hexane and then dried under vacuum to obtain a solid catalyst component for olefin polymerization. The data of the catalyst component are given in Table 3.

The pore size data of the solids measured by nitrogen adsorption method are given in Table 2. The pore size distribution of the catalyst is a multimodal pore size distribution.

B. Propylene Polymerization

At room temperature, to a 5-liter autoclave, in which the atmosphere had been fully replaced by nitrogen, were charged with 5 mL of a solution of triethylaluminum in hexane (having a triethylaluminum concentration of 0.5 mmol/mL), 1 mL of a solution of cyclohexylmethyldimethoxysilane (CHMMS) in hexane (having a CHMMS concentration of 0.1 mmol/mL), 10 mL of anhydrous hexane and 10 mg of the catalyst component from Example 6. One liter of hydrogen in standard state and 1.15 kg of liquid propylene were introduced thereinto. The temperature was raised to 70° C., and the polymerization was carried out at 70° C. for 1 hour. After the reaction was completed, the autoclave was cooled and the stirring was stopped, and then the reaction product was discharged to obtain an olefin polymer. The polymerization results of the catalyst and the polymer data are given in Table 3.

TABLE 1

| | | NLDFT algorithm | | | | | | |
|---|---|---|---|---|---|---|---|---|
| Item | Catalyst pore size distribution profile | The most probable pore size of the peak in the pore size range of less than 10 nm, nm | The most probable pore size of the peak in the pore size range of at least 10 nm, nm | Proportion of the pore volume with a pore size <5 nm | Proportion of the pore volume with a pore size ≥30 nm | Ratio of the pore volume with a pore size <10 nm to the pore volume with a pore size ≥10 nm | Specific surface area ($m^2/g$) | Pore volume ($cm^3/g$) |
| Ex. 1 | multimodal | 3.2 | 86.2 | 0.652 | 0.144 | 4.81 | 205.59 | 0.218 |
| Ex. 2 | multimodal | 2.9 | 68.5 | 0.174 | 0.536 | 0.37 | 165.13 | 0.413 |
| Ex. 3 | multimodal | 1.6 | 34.3 | 0.555 | 0.291 | 1.58 | 227.79 | 0.274 |
| Ex. 4 | multimodal | 4.6 | 73.9 | 0.738 | 0.056 | 8.02 | 243.39 | 0.179 |
| Ex. 5 | unimodal | 2.7 | no peak | 0.655 | 0.028 | 20.62 | 229.36 | 0.18 |
| Comp. Ex. 1 | unimodal | 4.3 | no peak | 0.663 | 0.02 | 35.71 | 184.86 | 0.182 |
| Comp. Ex. 2 | unimodal | 5 | no peak | 0.529 | 0.002 | 38.42 | 144.6 | 0.172 |

Notation: Under the NLDFT algorithm, the proportion of the pore volume with a pore size <5 nm refers to the ratio of the pore volume with a pore size <5 nm obtained by the NLDFT algorithm to the total pore volume calculated under this algorithm, and the other representations have analogical meanings. The pore volumes given in Table 1 are the BJH algorithm pore volume.

Example 6

A. Preparation of Solid Catalyst Component

To a reactor, in which air had been repeatedly replaced with high-purity nitrogen, 10.86 g of anhydrous magnesium chloride, 249 mL of toluene, 10.75 g of epichlorohydrin, and 70.7 g of tributyl phosphate were successively added, and the contents were maintained at 60° C. under the stirring of 300 rpm for 2 hours. Then, 2.5 g of phthalic anhydride was added, and the contents were maintained at 60° C. for an additional hour. The solution was cooled to 15° C. In advance, 2.1 g of surfactant (an alcoholysate of maleic anhydride-methacrylate copolymer, which is commercially available from Guangzhou Ruishengyan Chemical Technology Co., Ltd. under the tradename T632) and 220 ml of Example 7

A. Preparation of Solid Catalyst Component

To a reactor, in which air had been repeatedly replaced with high-purity nitrogen, 10.86 g of anhydrous magnesium chloride, 272 mL of toluene, 9.76 g of epichlorohydrin, and 78 g of tributyl phosphate were successively added, and the contents were maintained at 60° C. under the stirring of 300 rpm for 2 hours. Then, 3 g of phthalic anhydride was added, and the contents were maintained at 60° C. for an additional hour. The solution was cooled to 10° C. In advance, 3.2 g of surfactant (an alcoholysate of maleic anhydride-methacrylate copolymer, which is commercially available from Guangzhou Ruishengyan Chemical Technology Co., Ltd. under the tradename T632) and 240 ml of food-grade No. 100 white oil (having a kinematic viscosity at 40° C. of 100 $mm^2/s$) were mixed uniformly to form mixture 1. 135 ml of titanium tetrachloride and the mixture 1 were simultaneously added dropwise thereto over 40 min. After the dropwise addition was completed, the contents were stirred at 400 rpm for 2 hours. The temperature was then gradually increased to 85° C. over 3 hours, with 3 mL of 2,4-pentanediol dibenzoate as an electron donor being added during the temperature increasing, and the temperature was then kept constant at 85° C. for 1 hour. After filtration, the residual solids were washed twice with hot toluene. Next, 80 mL of titanium tetrachloride and 120 mL of toluene were added thereto, and the contents were maintained at a constant temperature of 110° C. for 0.5 hours and then filtered, and the operation was repeated once. Then, the obtained solids were washed 5 times with hexane and then dried under vacuum to obtain a solid catalyst component for olefin polymerization. The data of the catalyst component are given in Table 3.

Figure 5:
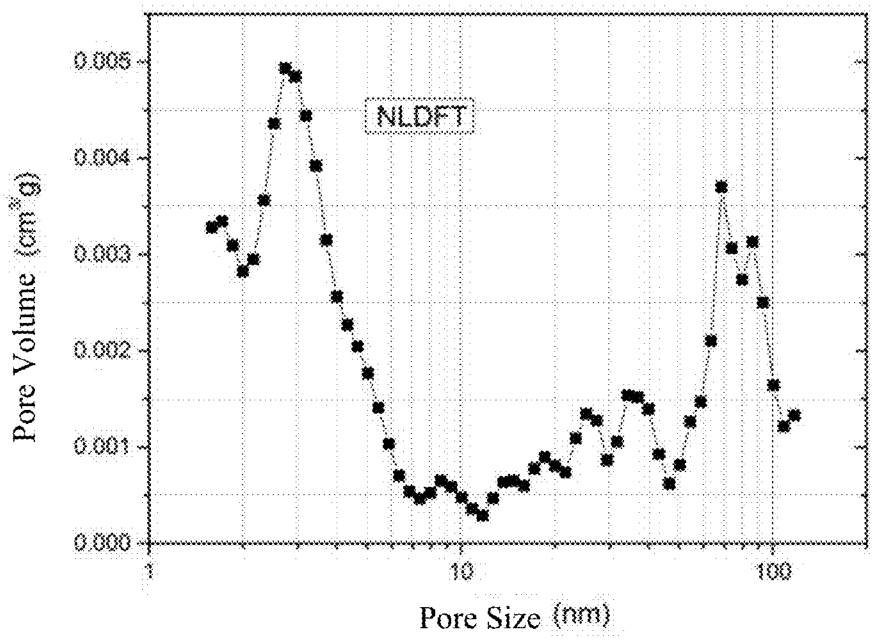
FIG. 5 shows the pore size distribution diagram of the catalyst component prepared in Example 7, measured by nitrogen adsorption method and calculated by NLDFT algorithm.

The pore size distribution diagram of the solid, measured by nitrogen adsorption method and calculated by the NLDFT algorithm, is shown in FIG. 5. It can be seen from FIG. 5 that the pore size distribution is shown as a multimodal pore size distribution, including at least one peak in a pore size range below 10 nm and at least another peak in a pore size range of not less than 10 nm. The pore size data of the solids measured by nitrogen adsorption method are given in Table 2.

B. Propylene Polymerization

Propylene polymerization method was the same as described for Example 6, and the polymerization data of the catalyst and the polymer data are given in Table 3.

Example 8

A. Preparation of Solid Catalyst Component

To a reactor, in which air had been repeatedly replaced with high-purity nitrogen, 10.86 g of anhydrous magnesium chloride, 211 mL of toluene, 11.5 g of epichlorohydrin, and 68 g of tributyl phosphate were successively added, and the contents were maintained at 60° C. with stirring for 2 hours. Then, 2.5 g of phthalic anhydride was added, and the contents were maintained at 60° C. for an additional hour. The solution was cooled to 0° C., 3 g of 9,9-dimethoxymethylfluorene was added thereto, and the contents were continuously stirred for 60 min. In advance, 2.5 g of surfactant (an alcoholysate of maleic anhydride-methacrylate copolymer, which is commercially available from Guangzhou Ruishengyan Chemical Technology Co., Ltd. under the tradename T632) and 260 ml of food-grade No. 100 white oil (having a kinematic viscosity at 40° C. of 100 $mm^2/s$) were mixed uniformly to form mixture 1. 165 ml of titanium tetrachloride and the mixture 1 were simultaneously added dropwise thereto over 40 min. After the dropwise addition was completed, the contents were stirred at 400 rpm for 1 hour. The temperature was then gradually increased to 85° C. over 4 hours and then kept constant for 1 hour. After filtration, the residual solids were washed twice with hot toluene. Next, 80 mL of titanium tetrachloride and 120 mL of toluene were added thereto, and the contents were maintained at a constant temperature of 110° C. for 0.5 hours and then filtered, and the operation was repeated once. Then, the obtained solids were washed 5 times with hexane and then dried under vacuum to obtain a solid catalyst component for olefin polymerization. The data of the catalyst component are given in Table 3.

The pore size data of the solids measured by nitrogen adsorption method are given in Table 2. The pore size distribution of the catalyst is a multimodal pore size distribution.

B. Propylene Polymerization

Propylene polymerization method was the same as described for Example 6, and the polymerization data of the catalyst and the polymer data are given in Table 3.

Example 9

A. Preparation of Solid Catalyst Component

The procedure was substantially the same as Example 6, except that the amount of the epichlorohydrin was changed to 14.2 g, the amount of the tributyl phosphate was changed to 53.2 g, the amount of the toluene was changed to 197 ml, and the amount of the titanium tetrachloride was changed to 133 ml, and that after the addition of the phthalic anhydride and the maintaining at 60° C. for an additional hour, the solution was cooled to 8° C. Catalyst component data are given in Table 3.

The pore size data of the catalyst measured by nitrogen adsorption method are given in Table 2. The pore size distribution of the catalyst is a multimodal pore size distribution.

B. Propylene Polymerization

Propylene polymerization method was the same as described for Example 6, and the polymerization data of the catalyst and the polymer data are given in Table 3.

Example 10

A. Preparation of Solid Catalyst Component

The procedure was substantially the same as Example 6, except that the amount of the epichlorohydrin used was changed to 7.2 g and the amount of the tributyl phosphate used was changed to 65.1 g, that the addition of the tributyl phosphate was followed by the addition of 2.2 g of ethanol, that the amount of the white oil used was changed to 184 ml and the amount of the titanium tetrachloride used was changed to 203 ml, and that after the addition of the phthalic anhydride and the maintaining at 60° C. for an additional hour, the solution was cooled to 0° C. Catalyst component data are given in Table 3.

The pore size data of the solids measured by nitrogen adsorption method are given in Table 2. The pore size distribution of the catalyst is a multimodal pore size distribution.

B. Propylene Polymerization

Propylene polymerization method was the same as described for Example 6, and the polymerization data of the catalyst and the polymer data are given in Table 3.

Example 11

A. Preparation of Solid Catalyst Component

To a reactor, in which air had been repeatedly replaced with high-purity nitrogen, were successively charged with 10.86 g of anhydrous magnesium chloride, 104 g of toluene, 10.5 g of epichlorohydrin, 70.0 g of tributyl phosphate, and 1.5 mL of ethylene glycol dibutyl ether, and the contents were maintained at 60° C. with stirring of 300 rpm for 2 hours. Then, 3.4 g of phthalic anhydride was added, and the contents were continuously stirred at 60° C. for an additional hour. The solution was cooled to 14° C., and the stirring speed was increased to 400 rpm. In advance, 128.5 g of food-grade No. 100 white oil (having a kinematic viscosity at 40° C. of 100 $mm^2/s$) and 5.7 g of surfactant (T602, commercially available from Guangzhou Ruishengyan Chemical Technology Co., Ltd.) were mixed to form mixture 1. 181.7 ml of titanium tetrachloride and the mixture 1 were simultaneously added dropwise thereto over 60 min. After the dropwise addition was completed, the contents were maintained for 1 hour to obtain mixture 2. The temperature was gradually increased to 80° C., 2.0 mL of 2-isopropyl-2-isopentyl-1,3-dimethoxypropane was added, and the temperature was raised to 85° C. and maintained for 1 hour. After filtering off the supernatant, the residual solids were washed three times with 200 mL of toluene. Next, the solids were treated with 120 mL of toluene and 80 mL of titanium tetrachloride at 90° C. for 1 hour, and then the liquid was filtered off. Then, the solids were treated with 120 mL of toluene and 80 mL of titanium tetrachloride at 110° C. for 1 hour, and then the liquid was filtered off. Next, the solids were washed 4 times with 200 mL of hexane, to afford a solid catalyst component for olefin polymerization. The catalyst physical property data are given in Table 3, and the catalyst pore size data are given in Table 2.

B. Propylene Polymerization

Propylene polymerization method was the same as described for Example 6, and the polymerization data of the catalyst and the polymer data are given in Table 3.

Example 12

A. Preparation of Solid Catalyst Component

To a reactor, in which air had been repeatedly replaced with high-purity nitrogen, were successively charged with 10.86 g of anhydrous magnesium chloride, 104 g of toluene, 7.2 g of epichlorohydrin, 75.2 g of tributyl phosphate, and 1.5 mL of 2-isopropyl-2-isopentyl-1,3-dimethoxypropane, and the contents were maintained at 60° C. with stirring of 300 rpm for 2 hours. Then, 4.59 g of phthalic anhydride was added, and the contents were maintained at 60° C. for an additional hour. The solution was cooled to 14° C., and the stirring speed was increased to 400 rpm. In advance, 128.5 g of food-grade No. 100 white oil (having a kinematic viscosity at 40° C. of 100 $mm^2/s$) and 5.7 g of surfactant (T602, commercially available from Guangzhou Ruishengyan Chemical Technology Co., Ltd.) were mixed to form mixture 1. 81.7 ml of titanium tetrachloride and the mixture 1 were simultaneously added dropwise thereto over 60 min. After the dropwise addition was completed, the contents were maintained for 1 hour. The temperature was gradually increased to 80° C. and maintained for 1 hour. After filtering off the supernatant, the residual solids were washed two times with 200 mL of toluene. Next, 160 mL of toluene, 40 mL of titanium tetrachloride and 2.6 mL of 2-isopropyl-2-isopentyl-1,3-dimethoxypropane were added, and the temperature was raised to 85° C. and maintained for 2 hours. After filtering off the liquid, the solids were treated with 120 mL of toluene and 80 mL of titanium tetrachloride at 90° C. for 1 hour, and then the liquid was filtered off. Then, the solids were treated with 120 mL of toluene and 80 mL of titanium tetrachloride at 110° C. for 1 hour, and then the liquid was filtered off. Next, the solids were washed 5 times with 200 mL of hexane, to afford a solid catalyst component for olefin polymerization. The catalyst physical property data are given in Table 3, and the catalyst pore size data are given in Table 2.

B. Propylene Polymerization

Propylene polymerization method was the same as described for Example 6, and the polymerization data of the catalyst and the polymer data are given in Table 3.

Example 13

A. Preparation of Solid Catalyst Component

To a reactor, in which air had been repeatedly replaced with high-purity nitrogen, were successively charged with 10.86 g of anhydrous magnesium chloride, 104 g of toluene, 12.43 g of epichlorohydrin, and 75.2 g of tributyl phosphate, and the contents were maintained at 60° C. with stirring of 300 rpm for 2 hours. Then, 4.59 g of phthalic anhydride was added, and the contents were maintained at 60° C. for an additional hour. The solution was cooled to 14° C., and the stirring speed was increased to 400 rpm. In advance, 128.5 g of food-grade No. 100 white oil (having a kinematic viscosity at 40° C. of 100 $mm^2/s$) and 5.7 g of surfactant (T602, commercially available from Guangzhou Ruishengyan Chemical Technology Co., Ltd.) were mixed to form mixture 1. 81.7 ml of titanium tetrachloride and the mixture 1 were simultaneously added dropwise thereto over 60 min. After the dropwise addition was completed, the contents were maintained for 1 hour. The temperature was gradually increased to 80° C. and maintained for 1 hour. After filtering off the supernatant, the residual solids were washed two times with 200 mL of toluene. Next, 160 mL of toluene, 40 mL of titanium tetrachloride and 3.6 mL of 2-isopropyl-2-isopentyl-1,3-dimethoxypropane were added, and the temperature was raised to 85° C. and maintained for 2 hours. After filtering off the liquid, the solids were treated with 120 mL of toluene and 80 mL of titanium tetrachloride at 90° C. for 1 hour, and then the liquid was filtered off. Then, the solids were treated with 120 mL of toluene and 80 mL of titanium tetrachloride at 110° C. for 1 hour, and then the liquid was filtered off. Next, the solids were washed 5 times with 200 mL of hexane, to afford a solid catalyst component for olefin polymerization. The catalyst physical property data are given in Table 3, and the catalyst pore size data are given in Table 2.

B. Propylene Polymerization

Propylene polymerization method was the same as described for Example 6, and the polymerization data of the catalyst and the polymer data are given in Table 3.

Comparative Example 3

A. Preparation of Solid Catalyst Component

The procedure was substantially the same as Example 6, except that the amount of the epichlorohydrin used was 10.75 g, the amount of the tributyl phosphate used was changed to 33.2 g, the amount of the toluene used was changed to 72 ml, the amount of the white oil used was changed to 120 ml, and the amount of the titanium tetrachloride used was changed to 112 ml, and that after the addition of the phthalic anhydride and the maintaining at 60° C. for an additional hour, the solution was cooled to 0° C. Catalyst component data are given in Table 3.

The pore size data of the catalyst measured by nitrogen adsorption method are given in Table 2. The pore size distribution of the catalyst is a unimodal pore size distribution.

B. Propylene Polymerization

Propylene polymerization method was the same as described for Example 6, and the polymerization data of the catalyst and the polymer data are given in Table 3.

Comparative Example 4

A. Preparation of Solid Catalyst Component

The procedure was substantially the same as Example 6, except that the amount of the tributyl phosphate used was changed to 38.8 g. Catalyst component data are given in Table 3.

The pore size data of the catalyst measured by nitrogen adsorption method are given in Table 2. The pore size distribution of the catalyst is a unimodal pore size distribution.

B. Propylene Polymerization

Propylene polymerization method was the same as described for Example 6, and the polymerization data of the catalyst and the polymer data are given in Table 3.

Comparative Example 5

A solid was prepared by the preparation method described in Example 1 in patent CN107207657A, except that the surfactant VISCOPLEX was changed to the surfactant used in Example 1. The solid was then maintained, together with 260 ml of a 20% titanium tetrachloride solution in toluene and 3 ml of di-n-butyl phthalate electron donor, at 85° C. for 1 hour. After filtering, the solids were washed twice with toluene. Then, 100 ml of titanium tetrachloride and 150 ml of toluene were added thereto, the temperature was maintained constant at 110° C. for 0.5 hours, and then the liquid was filtered off. This operation was repeated once. Then, the obtained solids were washed 5 times with hexane and then vacuum-dried to obtain a solid catalyst component for olefin polymerization. Catalyst component data are given in Table 3.

Figure 6:
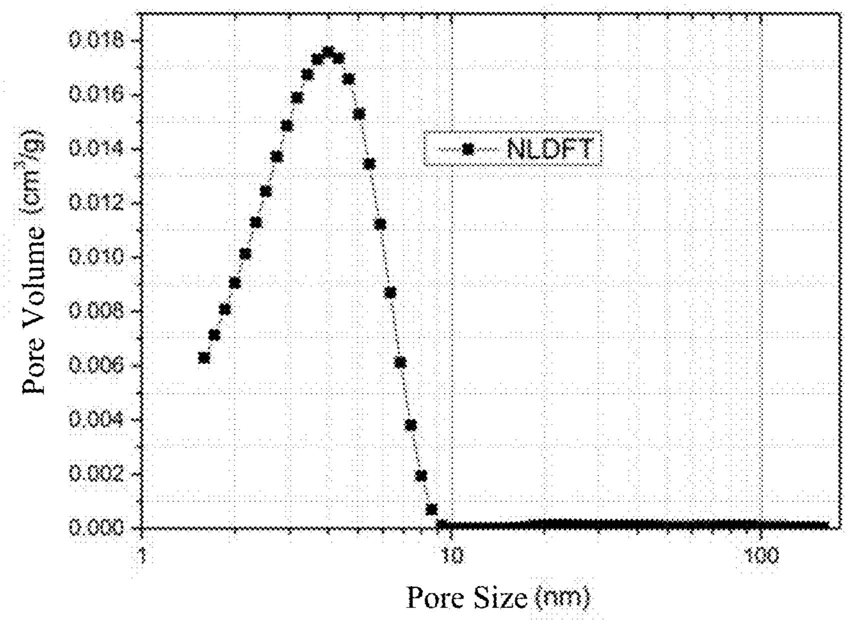
FIG. 6 shows the pore size distribution diagram of the catalyst component prepared in Comparative Example 5, measured by nitrogen adsorption method and calculated by NLDFT algorithm.

The pore size distribution diagram of the solids, measured by nitrogen adsorption method and calculated by the NLDFT algorithm, is shown in FIG. 6.

The pore size data of the catalyst measured by nitrogen adsorption method are given in Table 2. The pore size distribution of the catalyst is a unimodal pore size distribution.

Propylene polymerization method was the same as described for Example 6, and the polymerization data of the catalyst and the polymer data are given in Table 3.

Comparative Example 6

A solid was prepared by the preparation method of Example 1 in patent CN1097597C, except that diisobutyl phthalate was changed to 1.5 g of 9,9-dimethoxymethylfluorene. Catalyst component data are given in Table 3.

The pore size data of the catalyst measured by nitrogen adsorption method are given in Table 2. The pore size distribution of the catalyst is a unimodal pore size distribution.

Propylene polymerization method was the same as described for Example 6, and the polymerization data of the catalyst and the polymer data are given in Table 3.

Comparative Example 7

A solid was prepared by the preparation method of Example 1 in patent CN1097597C, except that diisobutyl phthalate was changed to 1.5 ml of 2,4-pentanediol dibenzoate. Catalyst component data are given in Table 3.

The pore size data of the catalyst measured by nitrogen adsorption method are given in Table 2. The pore size distribution of the catalyst is a unimodal pore size distribution.

Propylene polymerization method was the same as described for Example 6, and the polymerization data of the catalyst and the polymer data are given in Table 3.

Comparative Example 8

A solid was prepared by the preparation method of Example 1 in patent CN1097597C, except that diisobutyl phthalate was changed to 1.5 ml of 2-isopropyl-2-isopentyl-1,3-dimethoxypropane. Catalyst component data are given in Table 3.

The pore size data of the catalyst measured by nitrogen adsorption method are given in Table 2. The pore size distribution of the catalyst is a unimodal pore size distribution.

Propylene polymerization method was the same as described for Example 6, and the polymerization data of the catalyst and the polymer data are given in Table 3.

TABLE 2

| | | NLDFT algorithm | | | | | |
|---|---|---|---|---|---|---|---|
| Item | Catalyst pore size distribution profile | The most probable pore size of the peak in the pore size range of less than 10 nm, nm | The most probable pore size of the peak in the pore size range of at least 10 nm, nm | Proportion of the pore volume with a pore size <5 nm | Proportion of the pore volume with a pore size ≥30 nm | Specific surface area ($m^2/g$) | Pore volume ($cm^3/g$) |
| Example 6 | multimodal | 3.4 | 82.0 | 0.648 | 0.166 | 264.62 | 0.288 |
| Example 7 | multimodal | 2.7 | 68.5 | 0.503 | 0.312 | 156.71 | 0.200 |
| Example 8 | multimodal | 2.3 | 68.5 | 0.245 | 0.501 | 316.91 | 0.447 |
| Example 9 | multimodal | 1.6 | 34.2 | 0.505 | 0.331 | 332.56 | 0.395 |
| Example 10 | multimodal | 4.0 | 71.1 | 0.701 | 0.076 | 373.39 | 0.301 |
| Example 11 | multimodal | 2.9 | 68.5 | 0.553 | 0.285 | 299.09 | 0.333 |
| Example 12 | multimodal | 4.6 | 31.7 | 0.672 | 0.088 | 347.21 | 0.271 |
| Example 13 | multimodal | 2.7 | 42.5 | 0.186 | 0.571 | 208.28 | 0.437 |
| Comp. Ex. 3 | unimodal | 2.7 | no peak | 0.792 | 0.022 | 314.90 | 0.204 |
| Comp. Ex. 4 | unimodal | 2.9 | no peak | 0.763 | 0.033 | 316.76 | 0.224 |
| Comp. Ex. 5 | unimodal | 4.0 | no peak | 0.752 | 0.007 | 399.93 | 0.323 |
| Comp. Ex. 6 | unimodal | 3.8 | no peak | 0.531 | 0.002 | 202.32 | 0.197 |

TABLE 2-continued

| | | NLDFT algorithm | | | | | |
|---|---|---|---|---|---|---|---|
| Item | Catalyst pore size distribution profile | The most probable pore size of the peak in the pore size range of less than 10 nm, nm | The most probable pore size of the peak in the pore size range of at least 10 nm, nm | Proportion of the pore volume with a pore size <5 nm | Proportion of the pore volume with a pore size ≥30 nm | Specific surface area ($m^2/g$) | Pore volume ($cm^3/g$) |
| Comp. Ex. 7 | unimodal | 4.0 | no peak | 0.509 | 0.002 | 218.51 | 0.212 |
| Comp. Ex. 8 | unimodal | 3.8 | no peak | 0.551 | 0.002 | 233.02 | 0.222 |

Notation: Under the NLDFT algorithm, the proportion of the pore volume with a pore size <5 nm refers to the ratio of the pore volume with a pore size <5 nm obtained by the NLDFT algorithm to the total pore volume calculated under this algorithm, and the other representations have analogical meanings. The pore volumes given in Table 2 are the BJH algorithm pore volume.

TABLE 3

| Item | Ti wt % | Mg wt % | Internal electron donor wt % | Polymerization activity KgPP/gCat | BD g/$cm^3$ | II wt % | MI (g/10 min) | MWD |
|---|---|---|---|---|---|---|---|---|
| Example 6 | 1.78 | 18.3 | 8.4 | 38.4 | 0.43 | 98.3 | 4.3 | 6.1 |
| Example 7 | 1.83 | 18.1 | 10.4 | 34.4 | 0.42 | 98.5 | 4.7 | 8.4 |
| Example 8 | 1.83 | 18.1 | 9.4 | 54.7 | 0.44 | 98.5 | 3.7 | 5.2 |
| Example 9 | 1.63 | 18.2 | 9.1 | 32.3 | 0.40 | 98.1 | 4.5 | 6.2 |
| Example 10 | 3.62 | 17.5 | 9.3 | 28.8 | 0.39 | 98.4 | 3.3 | 5.7 |
| Example 11* | 1.94 | 17.7 | 9.2 | 58.2 | 0.43 | 98.0 | 3.5 | 5.8 |
| Example 12 | 2.28 | 18.4 | 9.5 | 72.4 | 0.43 | 98.7 | 3.8 | 4.7 |
| Example 13 | 1.78 | 18.7 | 9.5 | 56.1 | 0.42 | 98.5 | 3.8 | 4.9 |
| Comp. Ex. 3 | 1.58 | 18.4 | 8.7 | 37.1 | 0.47 | 97.6 | 5.1 | 4.9 |
| Comp. Ex. 4 | 1.82 | 18.3 | 8.7 | 32.5 | 0.45 | 97.8 | 3.6 | 5.3 |
| Comp. Ex. 5 | 1.34 | 18.7 | 9.2 | 24.8 | 0.39 | 97.7 | 4.6 | 4.8 |
| Comp. Ex. 6 | 2.13 | 18.6 | 9.9 | 54.1 | 0.45 | 98.1 | 3.8 | 3.7 |
| Comp. Ex. 7 | 2.12 | 18.5 | 10.1 | 50.4 | 0.42 | 98.4 | 4.5 | 6.7 |
| Comp. Ex. 8 | 2.10 | 18.3 | 9.4 | 42.1 | 0.45 | 97.5 | 3.6 | 3.2 |

*The content of internal electron donor for Example 11 is the content of 2-isopropyl-2-isopenty1-1,3-dimethoxypropane.

It can be seen from the data in Tables 1-3 and FIGS. 1-6 that the titanium-containing, magnesium-based solids and the magnesium chloride-supported olefin polymerization catalyst components obtained by the present invention have multimodal pore size distribution characteristics and higher specific surface areas, whereas the magnesium chloride-supported olefin polymerization catalysts shown in the comparative examples have unimodal pore size distribution characteristics. When the catalysts of the present invention are used for propylene polymerization, they have higher polymerization activities and higher stereo-orientation abilities, and the prepared polymers have wider molecular weight distribution.

It should be noted that the foregoing embodiments are only used to explain the present invention, and do not constitute any limitation to the present invention. The present invention has been described with reference to typical embodiments, but it should be understood that the words used therein are descriptive and explanative, rather than limitative. The present invention may be modified within the scope of the claims of the present invention as specified, and may be modified without departing from the scope and spirit of the present invention. Although the invention described herein refers to the specific methods, materials and embodiments, it is not intended to be limited to the specific examples disclosed therein, but rather, the invention extends to all other methods and applications having the same function.

The invention claimed is:

1. A magnesium-based solid with a multimodal pore distribution, comprising a magnesium halide as a carrier and a titanium component, wherein, as determined by a nitrogen adsorption method, the magnesium-based solid has a specific surface area of not less than 50 $m^2/g$ and a pore size distribution in a range of from 1 nm to 300 nm, wherein there are at least one peak within the pore size range of less than 10 nm and at least one peak within the pore size range of not less than 10 nm; the at least one peak within the pore size range of less than 10 nm has a most probable pore size of from 2 nm to 8 nm, and the at least one peak within the pore size range of not less than 10 nm has a most probable pore size of from 15 nm to 200 nm.

2. The magnesium-based solid as claimed in claim 1, wherein, in the magnesium-based solid, the ratio of the pore volume of pores with a pore size of less than 10 nm to the pore volume of pores with a pore size of not less than 10 nm is (0.1-20):1.

3. The magnesium-based solid as claimed in claim 1, wherein the pore volume of pores with a pore size of less than 5 nm accounts for 10% to 90% of the total pore volume; and the pore volume of pores with a pore size of not less than 30 nm accounts for 5% to 70% of the total pore volume.

4. A method for preparing the magnesium-based solid as claimed in claim 1, comprising:

S1: contacting a magnesium halide with a Lewis base in an organic solvent to form a magnesium-containing solution;

S2: contacting the magnesium-containing solution with an inert dispersion medium and a Lewis acid to form a mixture;

S3: in the presence of an auxiliary precipitant and a surfactant, precipitating the magnesium-based solid from the mixture, wherein, in step S1, the Lewis base includes an organic phosphorus compound, which is used in an amount of from 1.5 to 10 moles per mole of the magnesium halide; and in step S2, the Lewis acid includes a titanium-containing compound.

5. The method as claimed in claim 4, wherein, in step S1, the magnesium halide is of formula (1):

$$MgX^1_2 \quad (1),$$

wherein $X^1$ is chlorine, bromine or iodine; and/or the organic phosphorus compound is one or more of the compounds of formula (2) or formula (3):

(2)

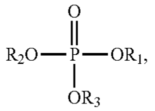

(3)

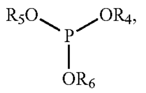

wherein each of $R_1$, $R_2$, $R_3$, $R_4$, $R_5$, and $R_6$ independently has 1-20 carbon atoms and is selected from the group consisting of linear or branched alkyl groups, cycloalkyl groups, aromatic hydrocarbon groups, and aromatic hydrocarbon groups having a substituent; and/or the organic solvent is one or more selected from the group consisting of aromatic hydrocarbon compounds and halogenated hydrocarbon compounds, and the organic solvent is used in an amount of from 1 to 40 moles, relative to one mole of the magnesium halide.

6. The method as claimed in claim 4, wherein, in step S2, the inert dispersion medium is one or more selected from the group consisting of kerosenes, paraffin oils, white oils, vaseline oils, methyl silicone oils, aliphatic, and cycloaliphatic hydrocarbons, and the inert dispersion medium is used in an amount of from 0.1 g to 300 g, relative to one gram of the magnesium halide; and/or the Lewis acid comprises a titanium-containing compound of formula (4):

$$TiX^2_m(OR^1)_{4-m} \quad (4),$$

wherein $X^2$ is chlorine, bromine, or iodine, $R^1$ is a hydrocarbon group having 1-20 carbon atoms, and m is an integer of 1 to 4, and the titanium-containing compound is used in an amount of from 0.5 to 25 moles, relative to one mole of the magnesium halide.

7. The method as claimed in claim 4, wherein, in step S3, the auxiliary precipitant is one or more selected from the group consisting of organic acids, organic acid anhydrides, organic ethers, and organic ketones, and the auxiliary precipitant is used in an amount of from 0.01 to 1 mole, relative to one mole of the magnesium halide; and/or the surfactant is one or more selected from the group consisting of alkyl (meth)acrylate polymers, alkyl (meth)acrylate copolymers, alcoholysates of maleic anhydride polymers, and alcoholysates of maleic anhydride copolymers, and the surfactant is used in an amount of from 0.01 g to 5 g, relative to one gram of the magnesium halide.

8. A solid catalyst component for olefin polymerization with a multimodal pore distribution, comprising the magnesium-based solid as claimed in claim 1 and at least one internal electron donor.

9. The solid catalyst component as claimed in claim 8, wherein, as measured by a nitrogen adsorption method, the solid catalyst component has a pore size distribution exhibiting multiple peaks and a specific surface area of not less than 50 $m^2/g$; wherein the pore size distribution is such that at least a first peak is in the pore size range of 1 nm-10 nm and at least a second peak is in the pore size range of 10 nm-200 nm, and wherein the first peak has a most probable pore size of from 2 nm to 8 nm, and the second peak has a most probable pore size of from 15 nm to 200 nm.

10. The solid catalyst component as claimed in claim 9, wherein the first peak has a most probable pore size of from 2 nm to 6 nm; and the second peak has a most probable pore size of from 20 nm to 100 nm.

11. The solid catalyst component as claimed in claim 8, wherein the pore volume of pores with a pore size of less than 5 nm accounts for 10% to 90% of the total pore volume; and the pore volume of pores with a pore size of not less than 30 nm accounts for 5% to 70% of the total pore volume.

12. The solid catalyst component as claimed in claim 8, wherein the internal electron donor is one or more selected from the group consisting of esters, ethers, ketones, amines, and silanes.

13. A method for preparing the solid catalyst component for olefin polymerization as claimed in claim 8, comprising adding at least one internal electron donor during the preparation of the magnesium-based solid; or/and contacting at least one internal electron donor with the magnesium-based solid, to obtain the solid catalyst component for olefin polymerization.

14. A catalyst system for olefin polymerization, comprising:

(1) the solid catalyst component as claimed in claim 8;

(2) an alkyl aluminum compound; and (3) optionally, an external electron donor.

15. A method for olefin polymerization, comprising polymerizing an olefin monomer in the presence of the solid catalyst component as claimed in claim 8.

16. A method for olefin polymerization, comprising polymerizing an olefin monomer in the presence of the catalyst system as claimed in claim 14.

17. The magnesium-based solid as claimed in claim 1, wherein the at least one peak within the pore size range of less than 10 nm has a most probable pore size of from 2 nm to 6 nm, and the at least one peak within the pore size range of not less than 10 nm has a most probable pore size of from 20 nm to 100 nm.

18. The magnesium-based solid as claimed in claim 1, wherein the at least one peak within the pore size range of less than 10 nm has a most probable pore size of from 2 nm to 6 nm, and the at least one peak within the pore size range of not less than 10 nm has a most probable pore size of from 30 nm to 90 nm.

19. The magnesium-based solid as claimed in claim 2, wherein in the magnesium-based solid, the ratio of the pore volume of pores with a pore size of less than 10 nm to the pore volume of pores with a pore size of not less than 10 nm is (0.25-15):1.

20. The magnesium-based solid as claimed in claim 3, wherein the pore volume of pores with a pore size of less than 5 nm accounts for 15% to 70% of the total pore volume; and the pore volume of pores with a pore size of not less than 30 nm accounts for 10% to 60% of the total pore volume.

21. The method as claimed in claim 4, wherein in step S1, the organic phosphorus compound is used in an amount of from 2 to 5 moles, per mole of the magnesium halide.

22. The method as claimed in claim 4, wherein in step S1, the Lewis base further includes an organic epoxy compound, which is used in an amount of from 0.1 to 10 moles, per mole of the magnesium halide.

23. The method as claimed in claim 5, wherein the organic phosphorus compound is one or more selected from the group consisting of trimethyl phosphate, triethyl phosphate, tributyl phosphate, tripentyl phosphate, triphenyl phosphate, trimethyl phosphite, triethyl phosphite, tributyl phosphite, and tribenzyl phosphite, and/or wherein the organic solvent is one or more selected from the group consisting of toluene, ethylbenzene, benzene, xylenes, and chlorobenzene, and the organic solvent is used in an amount of from 2 to 30 moles, relative to one mole of the magnesium halide.

24. The method as claimed in claim 6, wherein in step S2, the inert dispersion medium is one or more selected from the group consisting of white oils, hexanes, and decanes, and the inert dispersion medium is used in an amount of from 1 g to 150 g, relative to one gram of the magnesium halide; and/or wherein the titanium-containing compound is one or more selected from the group consisting of titanium tetrachloride, titanium tetrabromide, titanium tetraiodide, titanium tetrabutoxide, titanium tetraethoxide, triethoxy titanium chloride, diethoxy titanium dichloride, and ethoxy titanium trichloride, and the titanium-containing compound is used in an amount of from 1 to 20 moles, relative to one mole of the magnesium halide.

25. The method as claimed in claim 7, wherein the auxiliary precipitant is one or more selected from the group consisting of acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, and dipentyl ether, and the auxiliary precipitant is used in an amount of from 0.04 to 0.4 moles, relative to one mole of the magnesium halide; and/or wherein the surfactant is used in an amount of from 0.05 g to 1 g, relative to one gram of magnesium halide.

26. The solid catalyst component as claimed in claim 11, wherein the pore volume of pores with a pore size of less than 5 nm accounts for 15% to 70% of the total pore volume; and the pore volume of pores with a pore size of not less than 30 nm accounts for 10% to 60% of the total pore volume.

27. The solid catalyst component as claimed in claim 12, wherein the internal electron donor at least one selected from the group consisting of phthalates, malonates, succinates, glutarates, diol esters, diethers, neovalerates, and carbonates.

* * * * *